(12) United States Patent
Fitzgibbon et al.

(10) Patent No.: US 10,138,671 B2
(45) Date of Patent: Nov. 27, 2018

(54) BARRIER OPERATOR FEATURE ENHANCEMENT

(71) Applicant: The Chamberlain Group, Inc., Oak Brook, IL (US)

(72) Inventors: James J. Fitzgibbon, Batavia, IL (US); Robert R. Keller, Park Ridge, IL (US); James Scott Murray, Glendale Heights, IL (US); Cory Sorice, LaGrange, IL (US); Greg John Stanek, Aurora, IL (US); Colin Willmott, Buffalo Grove, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 15/881,406

(22) Filed: Jan. 26, 2018

(65) Prior Publication Data

US 2018/0148971 A1    May 31, 2018

Related U.S. Application Data

(60) Continuation of application No. 15/587,786, filed on May 5, 2017, now Pat. No. 9,896,877, which is a (Continued)

(51) Int. Cl.
*H04Q 1/00* (2006.01)
*E05F 15/77* (2015.01)
(Continued)

(52) U.S. Cl.
CPC ............. *E05F 15/77* (2015.01); *E05F 15/40* (2015.01); *E05F 15/60* (2015.01); *E05F 15/668* (2015.01);
(Continued)

(58) Field of Classification Search
USPC .................................. 340/5.61, 5, 5.7–5.71
See application file for complete search history.

(56) References Cited

U.S. PATENT DOCUMENTS

| 6,850 A | 11/1849 | Pope |
| 1,076,850 A | 10/1913 | Wedderburn |
(Continued)

FOREIGN PATENT DOCUMENTS

| AU | 2013254889 | 5/2014 |
| CA | 2831589 | 5/2014 |
(Continued)

OTHER PUBLICATIONS

MiCasa Verde.com—Vers2; http://www.micasaverde.com/vera.php; Accessed Sep. 2011.
(Continued)

*Primary Examiner* — Brent Swarthout
(74) *Attorney, Agent, or Firm* — Fitch, Even, Tabin & Flannery LLP

(57) ABSTRACT

A barrier operator feature enhancement device is designed to provide one or more features found in modern barrier operator devices and to incorporate those features into a previously installed barrier operator system. To facilitate ease of use, the barrier operator feature enhancement device can communicate with a large variety of barrier operators. Such communication may be wireless or wired, depending on the communication protocol implemented by a particular previously installed barrier operator. To facilitate the ease of installation, the device is designed to configure itself to operate with the communication protocol of the previously installed barrier operator. Once configured to be able to communicate with the previously installed barrier operator, the feature enhancement device works with the barrier operator to provide one or more additional features to
(Continued)

enhance the capabilities of the previously installed barrier operator.

16 Claims, 6 Drawing Sheets

Related U.S. Application Data continuation of application No. 15/069,351, filed on Mar. 14, 2016, now Pat. No. 9,644,416, which is a division of application No. 14/858,497, filed on Sep. 18, 2015, now Pat. No. 9,376,851, which is a continuation of application No. 14/010,143, filed on Aug. 26, 2013, now Pat. No. 9,141,099, which is a continuation of application No. 13/671,602, filed on Nov. 8, 2012, now Pat. No. 9,122,254.

(51) Int. Cl.

| | | |
|---|---|---|
| *G05B 15/00* | (2006.01) | |
| *H04L 29/08* | (2006.01) | |
| *G05B 15/02* | (2006.01) | |
| *G05B 19/042* | (2006.01) | |
| *E05F 15/60* | (2015.01) | |
| *E05F 15/668* | (2015.01) | |
| *E05F 15/40* | (2015.01) | |
| *E05F 15/70* | (2015.01) | |
| *G07C 9/00* | (2006.01) | |
| *G08G 1/04* | (2006.01) | |
| *G08G 1/042* | (2006.01) | |

(52) U.S. Cl.
CPC .............. *E05F 15/70* (2015.01); *G05B 15/00* (2013.01); *G05B 15/02* (2013.01); *G05B 19/042* (2013.01); *G07C 9/00309* (2013.01); *H04L 67/1097* (2013.01); *E05Y 2400/42* (2013.01); *E05Y 2400/44* (2013.01); *E05Y 2400/85* (2013.01); *E05Y 2800/70* (2013.01); *E05Y 2900/106* (2013.01); *G05B 2219/25168* (2013.01); *G05B 2219/25209* (2013.01); *G05B 2219/25217* (2013.01); *G05B 2219/2628* (2013.01); *G05B 2219/2642* (2013.01); *G07C 2009/00928* (2013.01); *G08G 1/04* (2013.01); *G08G 1/042* (2013.01); *H04L 67/12* (2013.01)

(56) References Cited

U.S. PATENT DOCUMENTS

| | | |
|---|---|---|
| 1,406,850 A | 2/1922 | Hadaway |
| 2,980,827 A | 4/1961 | Hill |
| 3,536,836 A | 10/1970 | Pfeiffer |
| 4,325,146 A | 4/1982 | Lennington |
| 4,360,801 A | 11/1982 | Duhame |
| 4,408,251 A | 10/1983 | Kaplan |
| 4,464,651 A | 8/1984 | Duhame |
| 4,533,905 A | 8/1985 | Leivenzon |
| 4,573,046 A | 2/1986 | Pinnow |
| 4,583,081 A | 4/1986 | Schmitz |
| 4,629,874 A | 12/1986 | Pugsley |
| 4,821,024 A | 4/1989 | Bayha |
| 4,881,148 A | 11/1989 | Lambropoulos |
| 4,922,224 A | 5/1990 | Drori |
| 4,987,402 A | 1/1991 | Nykerk |
| 5,003,293 A | 3/1991 | Wu |
| 5,047,928 A | 9/1991 | Wiedemer |
| 5,155,680 A | 10/1992 | Wiedemer |
| 5,191,268 A | 3/1993 | Duhame |
| 5,247,440 A | 9/1993 | Capurka |
| 5,255,341 A | 10/1993 | Nakajima |
| 5,278,832 A | 1/1994 | Binzel |
| 5,280,527 A | 1/1994 | Gullman |
| 5,283,549 A | 2/1994 | Mehaffey |
| 5,402,105 A | 3/1995 | Doyle |
| 5,444,440 A | 8/1995 | Heydendahl |
| 5,473,318 A | 12/1995 | Martel |
| 5,475,377 A | 12/1995 | Lee |
| 5,541,585 A | 7/1996 | Duhame |
| 5,565,843 A | 10/1996 | Meyvis |
| 5,565,857 A | 10/1996 | Lee |
| 5,596,840 A | 1/1997 | Teich |
| 5,608,778 A | 3/1997 | Partridge, III |
| 5,656,900 A | 8/1997 | Michel |
| 5,689,236 A | 11/1997 | Kister |
| 5,731,756 A | 3/1998 | Roddy |
| 5,780,987 A | 7/1998 | Fitzgibbon |
| 5,781,107 A | 7/1998 | Ji |
| 5,805,064 A | 9/1998 | Yorkey |
| 5,805,082 A | 9/1998 | Hassett |
| 5,883,579 A | 3/1999 | Schreiner |
| 5,886,634 A | 3/1999 | Muhme |
| 5,917,405 A | 6/1999 | Joao |
| 5,940,000 A | 8/1999 | Dykema |
| 5,969,637 A | 10/1999 | Doppelt |
| 5,990,828 A | 11/1999 | King |
| 6,002,332 A | 12/1999 | King |
| 6,011,468 A | 1/2000 | Lee |
| 6,026,165 A | 2/2000 | Marino |
| 6,028,537 A | 2/2000 | Suman |
| 6,070,361 A | 6/2000 | Paterno |
| 6,127,740 A | 10/2000 | Roddy |
| 6,131,019 A | 10/2000 | King |
| 6,154,544 A | 11/2000 | Farris |
| 6,161,005 A | 12/2000 | Pinzon |
| 6,166,634 A | 12/2000 | Dean |
| 6,184,641 B1 | 2/2001 | Crimmins |
| 6,192,282 B1 | 2/2001 | Smith |
| 6,223,029 B1 | 4/2001 | Stenman |
| 6,225,903 B1 | 5/2001 | Soloway |
| 6,266,540 B1 | 7/2001 | Edgar, III |
| 6,271,765 B1 | 8/2001 | King |
| 6,278,249 B1 | 8/2001 | Fitzgibbon |
| 6,310,548 B1 | 10/2001 | Stephens |
| 6,326,754 B1 | 12/2001 | Mullet |
| 6,346,889 B1 | 2/2002 | Moss |
| 6,356,868 B1 | 3/2002 | Yuschik |
| 6,388,559 B1 | 5/2002 | Cohen |
| 6,400,265 B1 | 6/2002 | Saylor |
| 6,404,337 B1 | 6/2002 | Van Till |
| RE37,784 E | 7/2002 | Fitzgibbon |
| 6,427,913 B1 | 8/2002 | Maloney |
| 6,434,158 B1 | 8/2002 | Harris |
| 6,434,408 B1 | 8/2002 | Heckel |
| 6,448,894 B1 | 9/2002 | Desai |
| 6,476,708 B1 | 11/2002 | Johnson |
| 6,476,732 B1 | 11/2002 | Stephan |
| 6,484,784 B1 | 11/2002 | Weik, III |
| 6,525,645 B2 | 2/2003 | King |
| 6,553,238 B1 | 4/2003 | Ginzel |
| 6,553,881 B2 | 4/2003 | Marmin |
| 6,561,255 B1 | 5/2003 | Mullet |
| 6,563,430 B1 | 5/2003 | Kemink |
| 6,564,056 B1 | 5/2003 | Fitzgerald |
| 6,597,291 B2 | 7/2003 | Tsui |
| 6,616,034 B2 | 9/2003 | Wu |
| 6,634,408 B2 | 10/2003 | Mays |
| 6,661,340 B1 | 12/2003 | Saylor et al. |
| 6,686,838 B1 | 2/2004 | Rezvani |
| 6,717,528 B1 | 4/2004 | Burleson |
| 6,781,516 B2 | 8/2004 | Reynard |
| 6,782,662 B2 | 8/2004 | McCartney |
| 6,792,083 B2 | 9/2004 | Dams |
| 6,803,851 B1 | 10/2004 | Kramer |
| 6,803,882 B2 | 10/2004 | Hoetzel |
| 6,812,849 B1 | 11/2004 | Ancel |
| 6,822,603 B1 | 11/2004 | Crimmins |
| 6,823,188 B1 | 11/2004 | Stern |
| 6,833,681 B2 | 12/2004 | Fitzgibbon |
| 6,850,163 B1 | 2/2005 | Adamczyk |
| 6,891,838 B1 | 5/2005 | Petite |

(56) References Cited

U.S. PATENT DOCUMENTS

| | | |
|---|---|---|
| 6,903,650 B2 | 6/2005 | Murray |
| 6,919,790 B2 | 7/2005 | Kanazawa |
| 6,924,727 B2 | 8/2005 | Nagaoka |
| 6,933,843 B1 | 8/2005 | Horn |
| 6,960,998 B2 | 11/2005 | Menard |
| 6,975,202 B1 | 12/2005 | Rodriguez |
| 6,975,226 B2 | 12/2005 | Reynard |
| 6,980,117 B1 | 12/2005 | Kirkland |
| 6,980,131 B1 | 12/2005 | Taylor |
| 6,989,760 B2 | 1/2006 | Dierking |
| 6,998,977 B2 | 2/2006 | Gregori |
| 7,024,819 B1* | 4/2006 | Irvin ............... E05F 15/79 49/25 |
| 7,038,409 B1 | 5/2006 | Mullet |
| 7,057,494 B2 | 6/2006 | Fitzgibbon |
| 7,071,813 B2 | 7/2006 | Fitzgibbon |
| 7,071,850 B1 | 7/2006 | Fitzgibbon |
| 7,091,688 B2 | 8/2006 | Gioia |
| 7,124,943 B2 | 10/2006 | Quan |
| 7,127,847 B2 | 10/2006 | Fitzgibbon |
| 7,142,849 B2 | 11/2006 | Neuman |
| 7,158,007 B2 | 1/2007 | Kawamoto |
| 7,161,319 B2 | 1/2007 | Ergun |
| 7,161,466 B2 | 1/2007 | Chuey |
| 7,167,076 B2 | 1/2007 | Wilson |
| 7,170,998 B2 | 1/2007 | McLintock |
| 7,190,266 B2 | 3/2007 | Mullet |
| 7,192,278 B2 | 3/2007 | Cao |
| 7,197,278 B2 | 3/2007 | Harwood |
| 7,205,908 B2 | 4/2007 | Tsui |
| 7,207,142 B2 | 4/2007 | Mullet |
| 7,221,289 B2 | 5/2007 | Horn |
| 7,227,444 B2 | 6/2007 | Fitzgibbon |
| 7,262,683 B2 | 8/2007 | Maeda |
| 7,266,344 B2 | 9/2007 | Rodriquez |
| 7,269,416 B2 | 9/2007 | Guthrie |
| 7,274,300 B2 | 9/2007 | Duvernell |
| 7,289,014 B2 | 10/2007 | Mullet |
| 7,298,240 B2 | 11/2007 | Lamar |
| 7,306,145 B2 | 12/2007 | Sakai |
| 7,310,043 B2 | 12/2007 | Mamaloukas |
| 7,323,991 B1 | 1/2008 | Eckert |
| 7,331,144 B2 | 2/2008 | Parsadayan |
| 7,332,999 B2 | 2/2008 | Fitzgibbon |
| 7,365,634 B2 | 4/2008 | Brookbank |
| 7,370,074 B2 | 5/2008 | Alexander |
| 7,380,375 B2 | 6/2008 | Maly |
| 7,392,944 B2 | 7/2008 | Sheih |
| 7,424,733 B2 | 9/2008 | Kamiwada |
| 7,446,644 B2 | 11/2008 | Schaffzin |
| 7,464,403 B2 | 12/2008 | Hardman, Jr. |
| 7,468,676 B2 | 12/2008 | Styers |
| 7,471,199 B2 | 12/2008 | Zimmerman |
| 7,482,923 B2 | 1/2009 | Fitzgibbon |
| 7,493,726 B2 | 2/2009 | Fitzgibbon |
| 7,498,936 B2 | 3/2009 | Maeng |
| 7,532,965 B2 | 5/2009 | Robillard |
| 7,561,075 B2 | 7/2009 | Fitzgibbon |
| 7,600,550 B2 | 10/2009 | Mays |
| 7,616,090 B2 | 11/2009 | Baker |
| 7,708,048 B2 | 5/2010 | Mays |
| 7,724,687 B2 | 5/2010 | Autret |
| 7,741,951 B2 | 6/2010 | Fitzgibbon |
| 7,750,890 B2 | 7/2010 | Fitzgibbon |
| 7,761,186 B2 | 7/2010 | Keller |
| 7,778,604 B2 | 8/2010 | Bauman |
| 7,783,018 B1 | 8/2010 | Goldberg |
| 7,852,212 B2 | 12/2010 | Fitzgibbon |
| 7,853,221 B2 | 12/2010 | Rodriguez |
| 7,856,558 B2 | 12/2010 | Martin |
| 7,876,218 B2 | 1/2011 | Fitzgibbon |
| 7,983,160 B2 | 7/2011 | Gunatilake |
| 7,983,180 B2 | 7/2011 | Harrington |
| 7,994,896 B2 | 8/2011 | Fitzgibbon |
| 7,995,460 B2 | 8/2011 | Edgar, III |
| 8,014,528 B2 | 9/2011 | Bunte |
| 8,040,217 B2 | 10/2011 | Fitzgibbon |
| 8,063,592 B2 | 11/2011 | Shier |
| 8,144,011 B2 | 3/2012 | Fitzgibbon |
| 8,175,591 B2 | 5/2012 | Fitzgibbon |
| 8,207,818 B2 | 6/2012 | Keller, Jr. |
| 8,239,481 B2 | 8/2012 | Alexander |
| 8,290,515 B2 | 10/2012 | Staton |
| 8,368,509 B2 | 2/2013 | Fitzgibbon |
| 8,416,054 B2 | 4/2013 | Fitzgibbon |
| 8,421,591 B2 | 4/2013 | Karasek |
| 8,423,788 B2 | 4/2013 | Holtzman |
| 8,544,523 B2 | 10/2013 | Mays |
| 8,561,348 B2 | 10/2013 | Kurth |
| 8,577,392 B1 | 11/2013 | Pai |
| 8,587,404 B2 | 11/2013 | Laird |
| 8,643,465 B2 | 2/2014 | Fitzgibbon |
| 8,797,138 B2 | 8/2014 | Myers |
| 8,868,220 B2 | 10/2014 | Crucs |
| 9,103,149 B2 | 8/2015 | Skotty |
| 9,122,254 B2 | 9/2015 | Cate |
| 9,141,099 B2 | 9/2015 | Cate |
| 9,317,985 B2 | 4/2016 | Tehranchi |
| 9,367,978 B2 | 6/2016 | Sullivan |
| 9,376,851 B2 | 6/2016 | Cate |
| 9,396,598 B2 | 7/2016 | Daniel-Wayman |
| 9,495,815 B2 | 11/2016 | Fitzgibbon |
| 9,644,416 B2 | 5/2017 | Fitzgibbon |
| 9,698,997 B2 | 7/2017 | Arteaga-King |
| 9,818,243 B2 | 11/2017 | Fitzgibbon |
| 9,896,877 B2 | 2/2018 | Fitzgibbon |
| 2001/0011941 A1 | 8/2001 | King |
| 2001/0017483 A1 | 8/2001 | Frohberg |
| 2002/0014954 A1 | 2/2002 | Fitzgibbon |
| 2002/0033760 A1 | 3/2002 | Kobayashi |
| 2002/0067308 A1 | 6/2002 | Robertson |
| 2002/0162175 A1 | 11/2002 | Berglund |
| 2002/0178385 A1 | 11/2002 | Dent |
| 2002/0180582 A1 | 12/2002 | Nielsen |
| 2002/0180600 A1 | 12/2002 | Kirkland |
| 2002/0183008 A1 | 12/2002 | Menard |
| 2003/0016119 A1 | 1/2003 | Teich |
| 2003/0016139 A1 | 1/2003 | Teich |
| 2003/0018478 A1 | 1/2003 | Mays |
| 2003/0023881 A1 | 1/2003 | Fitzgibbon |
| 2003/0029579 A1 | 2/2003 | Mays |
| 2003/0043021 A1 | 3/2003 | Chung |
| 2003/0071590 A1 | 4/2003 | Roman |
| 2003/0097586 A1 | 5/2003 | Mok |
| 2003/0098778 A1 | 5/2003 | Taylor |
| 2003/0118187 A1 | 6/2003 | Fitzgibbon |
| 2003/0150164 A1* | 8/2003 | Mehalshick ............ E06B 9/88 49/26 |
| 2003/0151493 A1 | 8/2003 | Straumann |
| 2003/0182132 A1 | 9/2003 | Niemoeller |
| 2003/0193388 A1 | 10/2003 | Ghabra |
| 2003/0216139 A1 | 11/2003 | Olson |
| 2003/0222754 A1 | 12/2003 | Cho |
| 2004/0012481 A1 | 1/2004 | Brusseaux |
| 2004/0012483 A1 | 1/2004 | Mays |
| 2004/0036573 A1 | 2/2004 | Fitzgibbon |
| 2004/0176107 A1 | 9/2004 | Chadha |
| 2004/0210327 A1 | 10/2004 | Robb |
| 2004/0212498 A1 | 10/2004 | Peterson |
| 2004/0229569 A1 | 11/2004 | Franz |
| 2004/0239482 A1 | 12/2004 | Fitzgibbon |
| 2004/0257189 A1 | 12/2004 | Chang |
| 2004/0257199 A1 | 12/2004 | Fitzgibbon |
| 2005/0012631 A1 | 1/2005 | Gregori |
| 2005/0030179 A1 | 2/2005 | Script |
| 2005/0033641 A1 | 2/2005 | Jha |
| 2005/0035873 A1 | 2/2005 | Kimura |
| 2005/0044906 A1 | 3/2005 | Spielman |
| 2005/0076242 A1 | 4/2005 | Breuer |
| 2005/0085248 A1 | 4/2005 | Bailey |
| 2005/0088281 A1 | 4/2005 | Rohrberg |
| 2005/0099299 A1 | 5/2005 | Tyroler |
| 2005/0110639 A1 | 5/2005 | Puzio |
| 2005/0113080 A1 | 5/2005 | Nishimura |

(56) References Cited

U.S. PATENT DOCUMENTS

| | | |
|---|---|---|
| 2005/0134426 A1 | 6/2005 | Mullet |
| 2005/0146417 A1 | 7/2005 | Sweatte |
| 2005/0170777 A1 | 8/2005 | Harwood |
| 2005/0174250 A1 | 8/2005 | Dierking |
| 2005/0195066 A1 | 9/2005 | Vandrunen |
| 2005/0206497 A1 | 9/2005 | Tsui |
| 2005/0242923 A1 | 11/2005 | Pearson |
| 2005/0245233 A1 | 11/2005 | Anderson |
| 2005/0258937 A1 | 11/2005 | Neuwirth |
| 2005/0272372 A1 | 12/2005 | Rodriguez |
| 2005/0273372 A1 | 12/2005 | Bowne |
| 2006/0038656 A1 | 2/2006 | Wilson |
| 2006/0056663 A1 | 3/2006 | Call |
| 2006/0077035 A1 | 4/2006 | Mamaloukas |
| 2006/0091998 A1 | 5/2006 | Fitzgibbon |
| 2006/0103503 A1 | 5/2006 | Rodriquez |
| 2006/0132284 A1* | 6/2006 | Murphy ............... G05B 19/042 340/5.7 |
| 2006/0137261 A1 | 6/2006 | Maly |
| 2006/0145811 A1 | 7/2006 | Nantz |
| 2006/0147052 A1 | 7/2006 | Wikel |
| 2006/0153122 A1 | 7/2006 | Hinman |
| 2006/0158344 A1 | 7/2006 | Bambini |
| 2006/0164208 A1 | 7/2006 | Schaffzin |
| 2006/0170533 A1 | 8/2006 | Chioiu |
| 2006/0187034 A1 | 8/2006 | Styers |
| 2006/0214783 A1 | 9/2006 | Ratnakar |
| 2006/0220785 A1 | 10/2006 | Ferdman |
| 2006/0223518 A1 | 10/2006 | Haney |
| 2006/0261932 A1 | 11/2006 | Ando |
| 2006/0279399 A1 | 12/2006 | Chuey |
| 2006/0281008 A1 | 12/2006 | Mitani |
| 2007/0005605 A1 | 1/2007 | Hampton |
| 2007/0005806 A1 | 1/2007 | Fitzgibbon |
| 2007/0028339 A1 | 2/2007 | Carlson |
| 2007/0046428 A1 | 3/2007 | Mamaloukas |
| 2007/0058811 A1 | 3/2007 | Fitzgibbon |
| 2007/0116194 A1 | 5/2007 | Agapi |
| 2007/0146118 A1 | 6/2007 | Rodriguez |
| 2007/0159301 A1 | 7/2007 | Hirt |
| 2007/0171046 A1 | 7/2007 | Diem |
| 2007/0177740 A1 | 8/2007 | Nakajima |
| 2007/0183597 A1 | 8/2007 | Bellwood |
| 2007/0185597 A1 | 8/2007 | Bejean |
| 2007/0283339 A1 | 12/2007 | Hardman |
| 2007/0290792 A1 | 12/2007 | Tsuchimochi |
| 2008/0061926 A1 | 3/2008 | Strait |
| 2008/0092443 A1 | 4/2008 | Herman |
| 2008/0106370 A1 | 5/2008 | Perez |
| 2008/0108301 A1 | 5/2008 | Dorenbosch |
| 2008/0130791 A1 | 6/2008 | Fitzgibbon |
| 2008/0132220 A1 | 6/2008 | Fitzgibbon |
| 2008/0224886 A1 | 9/2008 | Rodriguez et al. |
| 2008/0303706 A1 | 12/2008 | Keller |
| 2009/0005080 A1 | 1/2009 | Forstall |
| 2009/0063293 A1 | 3/2009 | Mirrashidi |
| 2009/0064056 A1 | 3/2009 | Anderson |
| 2009/0102651 A1 | 4/2009 | Fitzgibbon |
| 2009/0160637 A1 | 6/2009 | Maeng |
| 2009/0273438 A1 | 11/2009 | Sultan |
| 2009/0302997 A1 | 12/2009 | Bronstein |
| 2009/0315751 A1 | 12/2009 | Bennie |
| 2010/0120450 A1 | 5/2010 | Herz |
| 2010/0141381 A1 | 6/2010 | Bliding |
| 2010/0141514 A1 | 6/2010 | Bell |
| 2010/0159846 A1* | 6/2010 | Witkowski ......... G07C 9/00857 455/70 |
| 2010/0242360 A1 | 9/2010 | Dyas |
| 2010/0242369 A1 | 9/2010 | Laird |
| 2010/0289661 A1 | 11/2010 | Styers |
| 2010/0297941 A1 | 11/2010 | Doan |
| 2010/0299517 A1 | 11/2010 | Jukic |
| 2011/0025456 A1 | 2/2011 | Bos |
| 2011/0032073 A1 | 2/2011 | Mullet |
| 2011/0055909 A1 | 3/2011 | Dowlatkhah |
| 2011/0084798 A1 | 4/2011 | Fitzgibbon |
| 2011/0109426 A1 | 5/2011 | Harel |
| 2011/0130134 A1 | 6/2011 | VanRysselberghe |
| 2011/0193700 A1 | 8/2011 | Fitzgibbon |
| 2011/0205013 A1 | 8/2011 | Karasek |
| 2011/0234367 A1 | 9/2011 | Murphy |
| 2011/0254685 A1 | 10/2011 | Karasek |
| 2011/0258076 A1 | 10/2011 | Muirbrook |
| 2011/0311052 A1 | 12/2011 | Myers |
| 2011/0316667 A1 | 12/2011 | Tran |
| 2012/0092125 A1 | 4/2012 | Farber |
| 2012/0098638 A1 | 4/2012 | Crawford |
| 2012/0188054 A1 | 7/2012 | Bongard |
| 2012/0249289 A1 | 10/2012 | Freese |
| 2012/0280783 A1 | 11/2012 | Gerhardt |
| 2012/0280789 A1 | 11/2012 | Gerhardt |
| 2012/0280790 A1 | 11/2012 | Gerhardt |
| 2013/0017812 A1 | 1/2013 | Foster |
| 2013/0057695 A1 | 3/2013 | Huisking |
| 2013/0060357 A1 | 3/2013 | Li |
| 2013/0060358 A1 | 3/2013 | Li |
| 2013/0086841 A1* | 4/2013 | Luper ..................... E05F 15/43 49/28 |
| 2013/0093563 A1 | 4/2013 | Adolfsson |
| 2013/0147600 A1 | 6/2013 | Murray |
| 2013/0151977 A1 | 6/2013 | Arteaga-King |
| 2013/0257589 A1 | 10/2013 | Mohiuddin |
| 2013/0290191 A1 | 10/2013 | Dischamp |
| 2013/0328663 A1 | 12/2013 | Ordaz |
| 2014/0021087 A1 | 1/2014 | Adler |
| 2014/0118111 A1 | 5/2014 | Saladin |
| 2014/0125499 A1 | 5/2014 | Cate |
| 2014/0184393 A1 | 7/2014 | Witkowski |
| 2014/0253285 A1 | 9/2014 | Menzel |
| 2014/0266573 A1 | 9/2014 | Sullivan |
| 2014/0365781 A1 | 12/2014 | Dmitrienko |
| 2015/0067792 A1 | 3/2015 | Benoit |
| 2015/0221147 A1 | 8/2015 | Daniel-Wayman |
| 2016/0010382 A1 | 1/2016 | Cate |
| 2017/0241189 A1 | 8/2017 | Fitzgibbon |

FOREIGN PATENT DOCUMENTS

| | | |
|---|---|---|
| DE | 19801119 C1 | 9/1999 |
| EP | 0422190 | 10/1990 |
| EP | 0846991 | 11/1997 |
| EP | 0913979 A2 | 5/1999 |
| EP | 1151598 | 6/2000 |
| EP | 1227027 A2 | 7/2002 |
| EP | 0913979 | 8/2009 |
| FR | 2989799 A1 | 10/2013 |
| GB | 2404765 A | 2/2005 |
| JP | 2002019548 | 1/2002 |
| JP | 2004088774 | 3/2004 |
| JP | 4864457 | 2/2012 |
| KR | 2002032461 | 5/2002 |
| WO | 9012411 | 10/1990 |
| WO | 9515663 A1 | 6/1995 |
| WO | 9923614 A1 | 5/1999 |
| WO | 0036812 | 6/2000 |
| WO | 0193220 | 12/2001 |
| WO | 2002075542 A2 | 9/2002 |
| WO | 2009088901 | 7/2009 |
| WO | 2011055128 | 1/2011 |

OTHER PUBLICATIONS

Miele's Remote Vision Explained; http://www.miclensa.com/service/remote_vision/verify.aspx; Accessed Feb. 2012.
Net2 User Manual; Version 3; Paxton Access; "Date code: 281002".
New Zealand Application No. 706180; First Examination Report dated Apr. 10, 2015.
Office Action dated Aug. 27, 2014 from U.S. Appl. No. 13/921,584.
Office Action dated May 19, 2013 in U.S. Appl. No. 14/010,141.
Peter M. Corcoran and Joe Desbonnet; 'Browser-Style Interfaces to a Home Automation Network' Manuscript received Jun. 18, 1997, IEEE (c) 1997.

(56) References Cited

OTHER PUBLICATIONS

Press Release; Kenmore Uneils Reolutionary Technology Enabling Laundry Applicances to 'Talk' to Customer Serice Experts; PR Newswire, pNA, Aug. 4, 2010.
Protectrix Wireless automatic Garage Door Closer Timer Opener Security Accessory; http://www.closethegarage.com; printed Oct. 30, 2012.
Search History; C:\\APPS\\EAST\\workspaces\\garage_door_status_indicator.wsp; p. 4, Apr. 25, 2005.
Secure Smart Homes using. Jini and UIUC Sesame; Jalal Al-Muhtadi et al.; 1063-9527/00 .COPYRGT. 2000 IEEE.
Security System Installation Manual; Caretaker and Custom Versions; Interactive Technologies, Inc.; Issue Date May 5, 1994.
Security System Installation Manual; Caretaker and Custom Versions; Interactive Technologies, Inc.; Text No. 46-908-01 Rev. A; 1995.
Sensory, Inc. RSC-300/364 Data Book, Jan. 2001 (55 pages).
Smart Networks for Control; Reza S. Raji;IEEE Spectrum Jun. 1994.
Somfy's Slick Tahoma Z-Wire and RTS Home Automatation Gateway; Thomas Ricker; posted Jan. 4, 2011; http://www.engadget.com/2011/01/04/softys-tahoma-z-wave-and-rts-home-automation-gateway/.
Stephen Shankland; 'Need to lend your key? E-Mail it, Frauhofer says' news.cnet.com/8301-1035_3-57572338-94/need-to-lend-your-key-e-mail-it-fraunhofer-says/; pp. 1-5; CNET News, Mar. 4, 2013.
Summary of Findings From Parks Associates\\ Early Reports; pp. 9-13; Apr. 15, 2013 by Parks Associates.
Susan Cotterell, Frank Vahid, Walid Najjar, and Harry Hsieh; 'First Results with eBlocks: Embedded Systems Building Blocks' University of California, Rkverside pp. 168-175; Codes+ISSS'03, Oct. 1-3, 2003.
Svein Anders Tunheim; Wireless Home Automation Systems Require Low Cost and Low Power RF-IC Solutions; Wireless Home Automation Systems (rev. 1.0) May 16, 2002; p. 1 of 8.
The Craftsman Brant Announces Garage Door Opener of the Future—PR Newswire; The Sacramento Bee; http://www.sac bee.com/2011/09/27/2941742/the-craftsman-brand-announces.html; Sep. 27, 2011.
The iDorm—a Practical Deployment of Grid Technology; Anthony Pounds-Cornish, Arran Holmes; Intelligent Interactive Environments Group, University of Essex, UK; Proceedings of the 2nd IEEE/ACM International Symposium on Cluster Computing and the Grid (CCGRIO'02) 0/7695-1582-7/02 .COPYRGT. 2002 IEEE.
The Information Furnace: Consolidated Home Control; Diomidis D. SpinellisDepartment Management Science and Technology Athens University of Economics and Business; Personal and Ubiquitous Computing archive; vol. 7 Issue 1, May 2003.
The Information Furnace: User-friendly Home Control; Diomidis D. Spinellis, Department Management Science and Technology, Athens University of Economics and Business; SANE 2002; 3rd Int'l Sys. Admin. and Networking Conf. Proc., pp. 145-175, May 2002.
The Intelli-M eIDC32; True IP Access Control; htto://www.infinias.com/main/Products/eIDCController.aspx; Known and printed as early as Dec. 19, 2011.
Towards Dependable Home Networking: An Experience Report; Yi-Min Wang, Wilf Russell, Anish Arora, JunXu, Rajesh K. Jagannathan, Apr. 18, 2000, Technical Report, MSR-TR-2000-26, Microsoft Research, Microsoft Corporation.
U.S. Office Action dated Aug. 8, 2014 from U.S. Appl. No. 13/671,602.
U.S. Office Action dated Jan. 8, 2016 from U.S. Appl. No. 14/858,497.
U.S. Office Action dated Sep. 24, 2014 from U.S. Appl. No. 12/971,374.
U.S. Office Action dated Sep. 24, 2014 in U.S. Appl. No. 13/921,584.
ULStandard for Safety for Door, Drapery, Gate, Louver, and Window Operators and Systems, UL 325 Fifth Edition, Dated Jun. 7, 2002; pp. 1-186.
United States Office Action dated Sep. 18, 2014 from U.S. Appl. No. 14/010,143.
Universal Devices—ISY-99i Series; http://www.universal-devices.com/99i.htm; Accessed Sep. 2011.
Wayne-Dalton Press Area—New Z-Wave enabled prodrive; http://www.wayne-dalton.com/newsitem98.asp; Printed Oct. 13, 2011.
*Wireless Media Innovations LLC* v. *Maherterminals LLC* (2015 WL 1810378 (D.N.J.) Apr. 20, 2015) Submitted as Document #60 in *Chamberlain* vs. *Linear LLC and Nortek Security & Control LLC* ; Case No. 1:14-cv-05197, 11 Pages; Apr. 29, 2015.
www.brinkshomesecurity.com/home-security-systems-and-pricing/security-equipment/security-equipment.htm as printed on Feb. 11, 2009.
Xanboo Future Product; http://www.xanboo.com/xanproducts/newproducts.htm Feb. 2002, Xanboo Inc.
Xanboo XPC280 Wireless Universal Garage Door Control—Smarthome; http://www.smarthome.comf75066/Xanboo-XPC280-Wireless-Universal-Garage-Door-Control/p.aspx, printed Oct. 30, 2012.
XPress Access; Simple Personal Management; .COPYRGT. 2001 Andover Controls Corporation BR-XPACCESS-A.
Now You Can Close Your Garage Door With a Smartphone; Copyright 2011 USA Today; http://content.usatoday.com/communities/driveon/post/2011/09/now-you-can-control-your-garage-door-from-your-smartphone.
4Sight Internet Brochure; http://4sightsolution.4frontes.com/document/4CB-4S00-0809; Carrollton, TX; 2009; 5 pgs.
4th Usenix; Windows Systems Symposium; Seattle, Washington USA; Aug. 3-4, 2000; A Toolkit for Building Dependable and Extensible Home Networking Applications; Yi-Min Wang, Wilf Russell and Anish Arora.
6POWER, IPv6 and PLC for home automation; Terena 2004; Jordi Palet & Francisco Ortiz.
828LM—LiftMaster Internet Gateway; http://www.liftmaster.com/consumerweb/pages/accessoriesmodeldetail.aspx?m-odelld=2407; printed Oct. 30, 2012.
ActieHome PC Home Automation System; http://www.x10.com/promotions/ sw31 a_activehome_hmp.html?WENTY11; accessed Sep. 2011.
Arrayent; White Paper: Six System Requirements for an Internet-Connected Product Line; Copyright 2010; http://arrayent.com/pdfs/SixSystemRequirementsforInternetConnectedProductsLine.pdf.
Authentication vs. Encryption; Be in Control with Control Networks; Feb. 10, 2004; http://www.buildings.com/DesktcpModulesIBB ArlicleMaxfArticleDeta I/BBArticleDetai I Printaspx7ArliclelD=1740& Template=standm-d_Print.ascx&sitelD= 1.
Automatic Garage Door Closer Manual—Protectrix 18A—Dated Mar. 31, 2009.
Big blue builds home network technology; McCune, Heather; http://search.proquest.com/docview/194229104?accountid=12492; Apr 2003.
Bill Peisel; 'Designing the Next Step in Internet Applicances' Electronic Design/Mar. 23, 1998.
British Combined Search and Examination Report Under Section 17 and 18(3) from British Application No. GB0713690.6 dated Oct. 17, 2007.
British Search Report Under Section 17 dated Dec. 20, 2007 for Application No. GB0713690.6.
British Search Report Under Section 17; dated Oct. 17, 2007 for Application No. GB0713690.6.
Canadian Patent Application No. 2,533,795; Office Action dated Jan. 9, 2015.
Canadian Patent Application No. 2,533,795; Second Office Action dated Dec. 30, 2013.
Combined Search and Examination Report Cited in British Patent Application No. GB1025649.5 dated Aug. 8, 2012.
Controlling the Status Indicator Module of the Stanley Garage Door Opener Set; Rene Braeckman; Apr. 6, 2000.
Detroit Free Press Home Computing Column; Detroit Free; Newman, Heather; http://search.proquest.com/docview/4632707 4 7?accountid=12492; Knight Ridder/Tribune Business News; .COPYRGT. 2002, last updated Dec. 13, 2011.

(56) References Cited

OTHER PUBLICATIONS

Diomidis D. Spinellis; The information furnace: consolidated home control; Received: Jun. 1, 2002 / Accepted: Aug. 14, 2002; .COPYRGT. Springer-Verlag London Limited 2003.
Doug Olenick; Motorola Broadens Home Automation Line; http://search.proquest.com/docview/232255560?accountid=12492; vol. 20, COPYRGT. Jan. 6, 2005; last updated Sep. 1, 2011.
European Patent Application No. EP 1 280 109 A3; European Search Report dated Aug. 1, 2005.
European Patent Application No. EP 1 280 109 A3; European Search Report dated Aug. 11, 2005.
Examination Report dated Apr. 3, 2012 issuing from New Zealand Patent Application No. 599055.
Examination Report dated May 29, 2013 from British Patent Application No. GB1205649.5.
Examination Report Under Section 18(3) for GB1205649.5 dated Feb. 12, 2014.
Examination Report Under Section 18(3) for GB1205649.5 dated Jun. 11, 2014.
EZSrve-Insteon/X10 Home Automation Gateway—Model #5010L; hap:// www.simplehomenet.com/proddetail.asp?prod+9357342317, accessed Sep. 2011.
Fully-Loaded ActiveHome Pro PC Hom Automation System; http://www.x10.com/promotions/cm15a_Joaded_ps.html ; accessed Sep. 2011.
George Lawton; 'Dawn of the Internet Appliance' Computer, Industry Trends; Oct. 1, 1997.
Hassan A. Artail; A Distributed System of Network-Enabled Microcontrollers for Controlling and Monitoring Home Devices: IEEE 2002, pp. 206-209.
Hawking Technologies HomeRemote Wireless Home Automation Gateway Pro Starter Kit; The HRGZ2 HomeRemote Gateway; Smart Home Systems, Inc.; http://www.smarthomeusa.com/ShopByManufacturer/Hawking-Technologies/Item/HRPS1/; Accessed Sep. 2011.
HomeRemote Wireless Home Automation Gateway—PracticallyNetworked.com; Review date Aug. 2007; http://222.practicallynetworked.com/review.asp?pid=690; Accessed Sep. 2011.
HomeSeer HS2—Home Automation Software; http://store.homeseer.com/store/HomeSeer-HS2-Home-Automation-Software-Download-P103.aspx; Accessed Sep. 2011.
How to Internet-Connect Your Low Cost Consumer Retail Embedded Design; How to Prototype an Internet Connect Product; Hershy Wanigasekara; Sep. 13, 2010; http://www.eetimes.com/design/embedded/4027637/Internet-Connect-your-low-cost-consumer-retail-embedded-design.
How to Internet-Connect Your Low Cost Consumer Retail Embedded Design; Internet Connect Product Implementation Design Patterns; Hershy Wanigasekara; Sep. 13, 2010; http://www.eetimes.com/design/embedded/4027637/Internet-Connect-your-low-cost-consumer-retail-embedded-design.
Ian Bryant and Bill Rose; 'Home Systems: Home Controls;'p. 1-322; COPYRGT. 2001 Parks Associates.
Infinias Mobile Credential App for Android DroidMill; Known and printed as early as Dec. 19, 2011; http://droidmill.com/infinias-mobile-credential-1364120.html.
Intelli-M eIDC32; Ethernet-Enabled Integrated Door Controller; www.infinias.com; Known and printed as early as Dec. 19, 2011.
International Conference on Sensors and Control Techniques (IeSC 2000); Desheng Jiang, Anbo Wang, Fume and Temperature Alarm and Intelligent Control System of the District for Fire-Proof, Jun. 19-21, 2000, Wuhan, China, vol. 4077.
International Search Report and Written Opinion for PCT/US2014/057405 dated Dec. 17, 2014.
Internet Connected Garage Door Opener; Open New Doors at Sears; http:// www.sears.corri/shc/s/p_10153_12605_00930437000P?prdNo=I&blockNo=1&blockType=G1; printed Oct. 30, 2012.
James Y. Wilson and Jason A. Kranz; Inside Bluetooth Part II, Dr. Dobb's Portal; The World of Software Development; Dr. Dobb's Journal; Jul. 22, 2001; 9 pages.
Jan. 7, 2011 Opposition to Chamberlain's Motion to Exclude Evidence of Chamberlain's Use of IEI Intellectual Property; US District Court—Western District of Washington at Tacoma; Case No. C09-5438 BHS.
K.K. Tan, Y.L. Lim and H.L. Goh; "Remote Adaptive Control and Monitoring" IEEE (c) 2002.
Kenmore Connect; http:/www.kenmore.com/shc/s/dap_10154_12604_DAP_Kenmore+Connect; 2010 Sears Brands, LLC.
Kurt Scherf, Michael Greeson and Tricia Parks; 'Primary Perspectives: 'E-Enabled' Home Security;' pp. 1-87; .COPYRGT. 2003 Parks Associates.
Liftmaster Debuts New Intelligence in Garage Door Openers at IDS 2011; New Generation of LiftMaster Models and Accessories Enabled by MyQ Technology; Elmhurst, IL; Jun. 7, 2011; http://www.liftmaster.com/NR/rdonlyres/0A903511-21AB-4F0A-BBCD-196D41503CF2/4305/LiftMasterUneilsMyQTechnologyIDA2011_FINAL.pdf.
LiftMaster Internet Gateway: Your Simple Solution to Home Control; http:// www.liftmaster.com/consumerweb/products/IntroducingLiftMasterInternetGateway, printed Oct. 30, 2012.
LiftMaster; MyQ Enabled Accessory: LiftMaster Internet Gateway (Model 828); Known as of Dec. 19, 2011.
Australian Patent Application No. 2017261560; Examination Report No. 1; dated Jun. 14, 2018, 5 pages.
Australian Patent Application No. 2013254889; Examination Report No. 1; dated Jan. 13, 2017, 5 pages.

\* cited by examiner

BARRIER OPERATOR FEATURE ENHANCEMENT

RELATED APPLICATIONS

This application is a continuation of U.S. patent application Ser. No. 15/587,786, Filed May 5, 2017, entitled BARRIER OPERATOR FEATURE ENHANCEMENT, now U.S. Pat. No. 9,896,877, which is a continuation of U.S. patent application Ser. No. 15/069,351, Filed Mar. 14, 2016, entitled BARRIER OPERATOR FEATURE ENHANCEMENT, now U.S. Pat. No. 9,644,416, which is a divisional of U.S. patent application Ser. No. 14/858,497, filed Sep. 18, 2015, entitled BARRIER OPERATOR FEATURE ENHANCEMENT, now U.S. Pat. No. 9,376,851, which is a continuation of U.S. patent application Ser. No. 14/010,143, filed Aug. 26, 2013, entitled BARRIER OPERATOR FEATURE ENHANCEMENT, now U.S. Pat. No. 9,141,099, which is a continuation of U.S. patent application Ser. No. 13/671,602, filed Nov. 8, 2012, entitled BARRIER OPERATOR FEATURE ENHANCEMENT, now U.S. Pat. No. 9,122,254. Each of U.S. patent application Ser. Nos. 15/587,786, 15/069,351, 14/858,497, 14/010,143 and 13/671,602 are incorporated by reference in their entireties herein.

TECHNICAL FIELD

This invention relates generally to barrier operators and more specifically to adding features to pre-installed barrier operators.

BACKGROUND

Barrier operators of various kinds have been known and used for many years. Examples of such barrier operators include gate operators, rolling shutter operators, garage door operators, and the like. In one example, garage door operators are mounted within a garage to automate the process of opening and closing a garage door. Such garage door operators are designed to last for many years. In its simplest form, a garage door operator includes a motor connected to move a barrier between an open position and a closed position and control circuitry configured to control the motor. Such garage door operators can last and reliably operate a garage door for many years with basic maintenance.

More recently, however, barrier operators have begun evolving to include additional features beyond the simple task of opening and closing the barrier. Such new features include various safety features, lighting options, network communication options including remote operation of the barrier operator, and the like. To have access to such features, however, typically a completely new barrier operator with a new motor and connection equipment must be purchased and installed for a user to have access to the new features. This contradicts the reality where barrier operators are generally designed to perform their core function of opening and closing a barrier for many years.

SUMMARY

Generally speaking, and pursuant to these various embodiments, a barrier operator feature enhancement device is designed to provide one or more features found in modern barrier operator devices and to incorporate those features into a previously installed barrier operator system. To facilitate ease of use, the barrier operator feature enhancement device is designed to be able to communicate with a large variety of older model barrier operator systems. Such communication may be wireless or wired, depending on the communication protocol implemented by a particular previously installed barrier operator. To facilitate the ease of installation of the feature enhancement device, the device is designed to, in one approach, step through a variety of communication protocols and to receive feedback information from either the barrier operator or another device to indicate that the previously installed barrier operator performed an action in response to receipt of a communication from the feature enhancement device. Based on that feedback, the feature enhancement device configures itself to operate going forward with the communication protocol that elicited the response from the previously installed barrier operator.

Once configured to be able to communicate with the previously installed barrier operator, the feature enhancement device works with the barrier operator to provide one or more additional features to enhance the capabilities of the previously installed barrier operator. Examples include adding safety features such as the use of obstacle detectors, adding remote communication and network based communication features, enabling timer based open and close features, enabling vehicle and person detection features, and the like. These and other benefits may become clearer upon making a thorough review and study of the following detailed description.

BRIEF DESCRIPTION OF THE DRAWINGS

The above needs are at least partially met through provision of the barrier operator feature enhancement described in the following detailed description, particularly, when studied in conjunction with the drawings wherein.

Skilled artisans will appreciate the elements and the figures are illustrated for simplicity and clarity and have not necessarily been drawn to scale. For example, the dimensions and/or relative positioning of some of the elements in the figures may be exaggerated relative to other elements to help improve understanding of various embodiments. Also, common but well understood elements that are useful or necessary in a commercially feasible embodiment are often not depicted to facilitate a less obstructive view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions and a person skilled in the technical field as set forth above, except where different specific meanings have otherwise been set forth herein.

DETAILED DESCRIPTION

Figure 1:
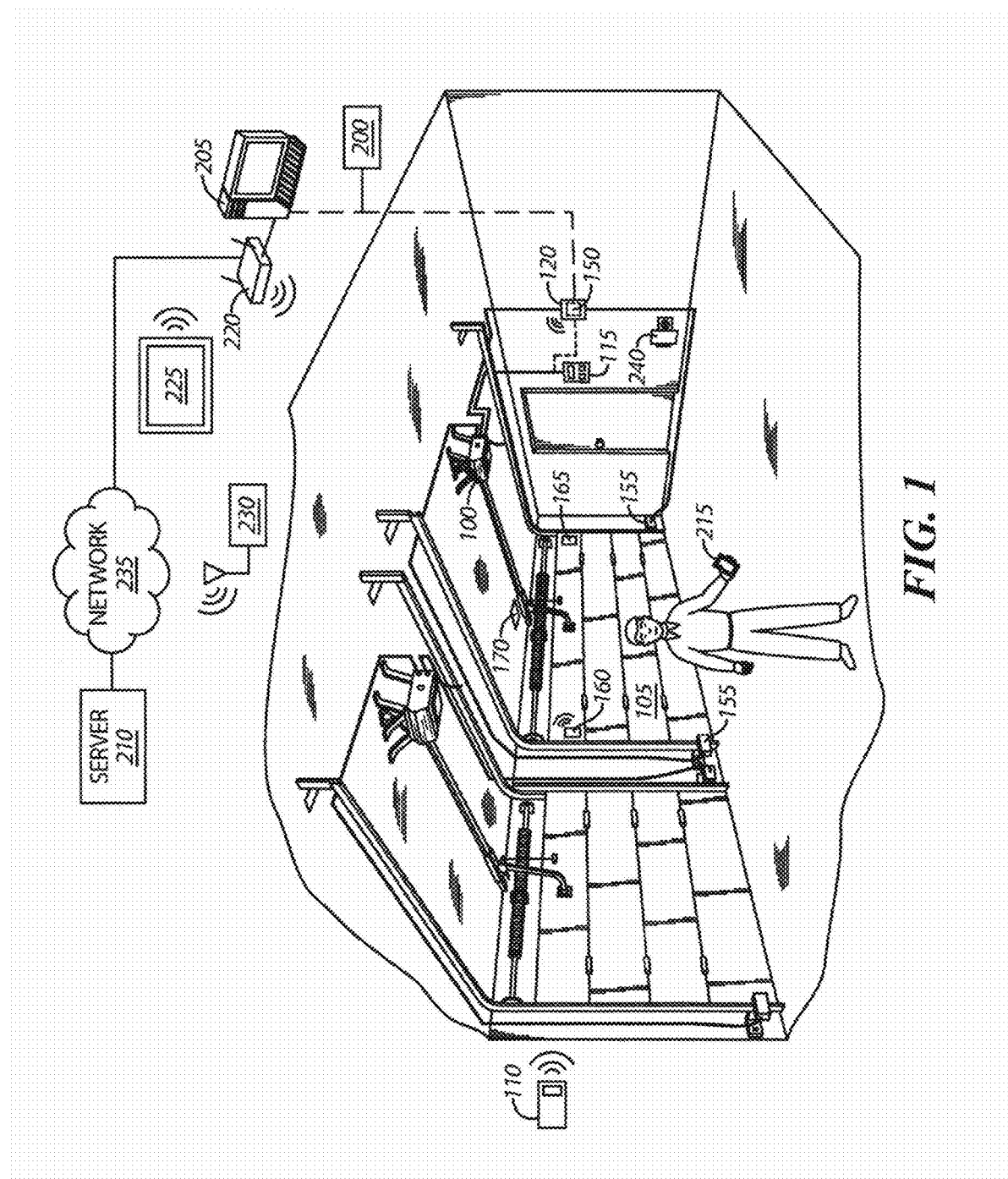
FIG. 1 comprises a perspective view of an example environment in which a barrier operator feature enhancement device may be applied as configured in accordance with various embodiments of the invention.

Referring now to the drawings and, in particular, to FIG. 1, an example environment in which a barrier operator feature enhancement device may operate will now be presented. A previously installed barrier operator 100 is configured to move a barrier 105 between open and closed positions. In the illustrated example, the barrier operator is a garage door opener configured to open and close a garage door for a typical garage although the subject matter described herein can be applied to a variety of other barrier operator settings. The barrier operator 100 can be activated to open or close the barrier 105 using a remote control device 110 or a wired wall control 115. The remote control device 110 communicates directly with the barrier operator 100 using a radio frequency based, wireless communication that is received and analyzed by the barrier operator 100 to determine what action it should take in response to receipt of the signal from the remote control device 110. Similarly, the wall control device 115 includes buttons that when pressed effect sending a signal over the wire to the barrier operator 100 to effect the opening or closing of the barrier 105 or performance of another action. A barrier operator feature enhancement device 120 can be introduced into this space to add additional features to the barrier operator system present within this particular garage.

Figure 2:
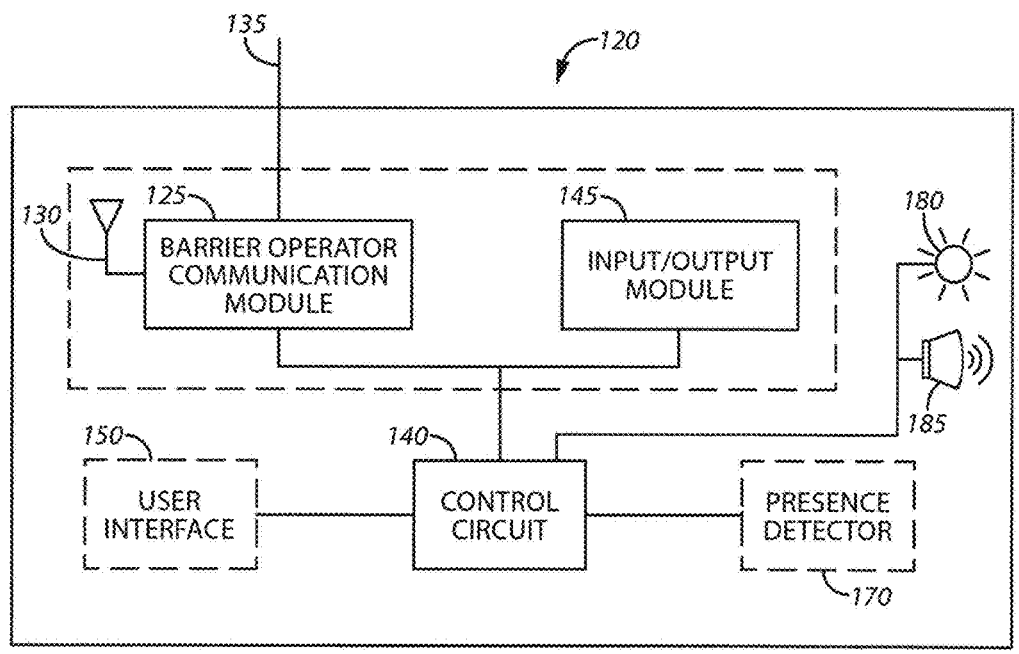
FIG. 2 comprises a block diagram of an example barrier operator feature enhancement device as configured in accordance with various embodiments of the invention.

With reference to FIG. 2, an example barrier operator feature enhancement device 120 will be described. This apparatus includes a barrier operator communication module 125 that is configured to be able to communicate with a plurality of barrier operator types by sending communication signals by wireless or wired communication protocols. To facilitate this ability, the barrier operator communication module 125 includes an antenna 130 that may be built-in or external to the device 120. The communication module 125 may also include a wired communication port 135 configured to be connected through one or more wires to a barrier operator. The feature enhancement device 120 also includes control circuitry 140 configured to use the barrier operator communication module 125 to communicate with any of the plurality of barrier operator types. So configured, the barrier operator feature enhancement device readily facilitates installation and coordination with a variety of previously installed barrier operator types. For example, the barrier operator feature enhancement device is configured to communicate with all or a subset of all barrier operators currently installed. Thus, a user who purchases a barrier operator feature enhancement device can be reasonably assured that the enhancement device is compatible with the user's particular previously installed barrier operator.

One approach for configuring communication between the barrier operator feature enhancement device 120 and the previously installed barrier operator 100 includes the control circuitry 140 being configured to effect sending communication signals from the barrier operator communication module 125 via a plurality of communication protocols to the pre-installed barrier operator 100. For example, the barrier operator communication module 125 can be configured to be able to communicate with the plurality of barrier operator types by sending communication signals by one or more of wire-line relay switch activation, wire-line serial communications, wire-line encrypted serial communications, a first wireless transmission protocol based on a hand-held transmitter frequency, a second wireless transmission protocol different from the first wireless transmission protocol, radio frequency communications based on a frequency different from hand-held transmitter frequencies, radio frequency communications based on frequency hopping for spread spectrum, to name but a few, and combinations thereof. Generally speaking, as used in this application, a "hand-held transmitter" refers to a typical garage door controller that, for instance, clips to a vehicle visor and has a button that a user presses to open and close a garage door.

By one approach, the control circuitry 140 can wait for a time after sending a communication signal to the pre-installed barrier operator 100 to receive a communication indicating a response from the pre-installed barrier operator 100 before sending another communication signal using a different protocol. The communication indicating the response from the pre-installed barrier operator can be received in a number of ways. For example, the receipt may occur through an input/output module 145 that will be described below. Examples signals include ones from a door sensor or limit sensor indicating door movement. In response to receiving the communication indicating the response from the pre-installed barrier operator, the control circuitry 140 configures the barrier operator communication module 125 to operate according to the communication protocol that effected the response from the pre-installed barrier operator 100. By this example approach, the barrier operator feature enhancement device 120 can configure itself or learn the communication protocol with which it can communicate with the pre-installed barrier operator 100 with minimal intervention or effort on behalf of the device's user.

By another approach, the control circuitry 140 may be configured to learn the communication protocol for the pre-installed barrier operator 100 by analyzing a signal received by the barrier operator feature enhancement device 120 from a peripheral device. In one such approach, the control circuitry 140 is configured to analyze a signal received at the input/output module 145 from a peripheral device comprising a hand-held transmitter 110 associated with the pre-installed barrier operator 100 to determine a communication protocol associated with the pre-installed barrier operator 100. For example, the control circuitry 140 can break down the radio frequency communication sent by the hand-held transmitter 110 to determine its characteristics and then adopt those characteristics for the barrier operator communication module 125. U.S. Pat. Nos. 7,057,494 and 7,741,951, incorporated herein by reference, describe example approaches currently known to those skilled in the art for learning a transmission protocol. Accordingly, this control circuitry 140 can configure the barrier operator communication module 125 to operate according to the communication protocol associated with the pre-installed barrier operator 100.

In still another approach, the barrier operator feature enhancement device 120 can include a user interface 150. For example, the control circuitry 140 configures the barrier operator communications module 125 to operate according to a communication protocol in response to receipt of an instruction signal through the user interface 150. In one such approach, a list of barrier operator types can be provided to a user through the user interface 150 or through separate documentation that will allow the user to use the user interface 150 to input the barrier operator type to the feature enhancement device 120. In response to receipt of this feedback from the user interface 150, the control circuitry 140 can access a memory or other storage such as an online database that will associate a communication protocol with the barrier operator type information received through the user interface 150. The control circuitry 140 will then configure the barrier operator communication module 125 to operate in accordance with that communication protocol. In a further aspect, a similar user interface can be provided on other device remote from the feature enhancement device 120. For instance, a mobile device or other computer can be programmed, run an application, or receive signals from another device to effect display of a user interface that allows a user to interact with the feature enhancement device 120.

Once the communication protocol for the previously installed barrier operator 100 is determined, the control circuitry 140 is configured to use the barrier operator communication module 125 to communicate to at least one pre-installed barrier operator 100 to effect at least one of control of operation of at least one feature of the at least one pre-installed barrier operator 100 or monitoring at least one aspect of the at least one pre-installed barrier operator 100. Control of the operation of a feature of a pre-installed barrier operator 100 can include moving a barrier 105, stopping or overriding a function of the pre-installed movable barrier operator 100, operating another function of a pre-installed movable barrier 100 such as operating a light, controlling a vacation mode, and the like, or changing an operation parameter such as a force setting or programmed operation mode of a pre-installed barrier operator 100 to name but a few examples. Generally speaking, sending a communication to a pre-installed barrier operator 100 to control operation can be considered effecting a change in function of the barrier operator 100. Monitoring an aspect of a pre-installed barrier operator includes monitoring a barrier 105 status (such as open or closed) and watching other operation statuses of the operator 100 including error conditions, tamper warnings, and usage history to name only a few examples. As illustrated in FIG. 1, the feature enhancement device 120 can be deployed in a garage or other setting where more than one pre-installed barrier operator 100 is in use. In such a setting, the feature enhancement device 120 can be configured to operate with one, both, or in other installations, several or a subset of a group of previously installed barrier operators. In an example multiple barrier installation, the feature enhancement device can communicate with peripheral devices for a variety of barriers by storing identification information that is sent from individual peripheral devices together with communication signals to the feature enhancement device. So paired, the feature enhancement device can accurately monitor and control each of the multiple barriers with which it is paired.

Moreover, the communication to be had with any one pre-installed barrier operator 100 depends upon the capabilities of that operator 100. For instance, older operators generally only communicated through receipt of a signal that causes immediate operation of the motor to open or close the barrier 105. In such a situation, the feature enhancement device 120 will merely send signals to effect such operation and rely on other peripheral devices to facilitate monitoring of other aspects of the barrier operator such as door position and obstacle detection. Other operators have the ability to send information out regarding its status. For example, some operators are able to determine barrier position, force settings, light settings, and the like and provide this information to other devices. For those operators, the feature enhancement device 120 is configured to be able to send signals to such an operator to effect the operator 100 sending back such status information in a manner that the feature enhancement device 120 can understand the information and use the information to provide enhanced feature control for a user including, for example, automatically sending control signals to change a function of the barrier operator 100 in response to receiving particular status information from the operator 100.

Turning again to FIG. 2, the input/output module 145 is operatively in communication with the control circuitry 140. The input/output module 145 is configured to receive communications from at least one peripheral device configured to provide at least one of information regarding an operation status of the pre-installed barrier operator 100 or information to effect operation of the pre-installed barrier operator 100. These communications can be performed by a number of different physical layer structures. In one example, the communication can be carried via a wired or bus connection or via a wireless radio communication. The wireless communication can follow any protocol including single frequency, spread spectrum, Wi-Fi, BLUETOOTH, and the like. Generally speaking, the input/output module 145 is designed to provide for communications with any of a variety of devices other than the barrier operator 100. So configured, the input/output module 145 can facilitate many types of interactions with other devices, examples of which will be disclosed below.

Those skilled in the art will recognize and understand that such a module 145 and operator communication module 125 may be comprised of a plurality of physically distinct elements as is suggested by the illustration shown in FIG. 2. It is also possible, however, to view this illustration as comprising a logical view, in which case one or more of these elements can be enabled and realized via a shared platform such that the operations described as being separate at the operator communication module 125 and the input/output module 145 are performed by the same physical elements. It will also be understood that such a shared platform may comprise a wholly or at least partially programmable platform as are known in the art. Moreover, the interfaces for the feature enhancement device 120 for the peripheral devices may include different physical implementations to effect such communication, such as with wireless or wired obstacle detectors, with a wired or wireless wall controller, with a wireless or radio communication device, or with another device. Such communication hardware configured to communicate with the individual peripheral devices are generally known and applicable by those of skill in the art and need no further discussion herein.

For example and with reference to FIG. 1, such peripheral devices with which the input/output module 145 communicates may include a computing device 200, a home computer 205, a server computing device 210, a mobile computing device 215, a gateway device 220 configured to enable communications with one or more of a home computer 205, server computing device 210, a mobile computing device 225, or a mobile computing device 230 over a network 235, and combinations thereof. Communications with any of these devices can be made using wired or wireless protocols as are known in the art. Communications with such computing devices can facilitate all manner of network communications such as communications with applications on smart phones and the like or facility monitoring systems as may be available or controlled by networked computing devices.

Other than just computing devices, the peripheral device from which the input/output module 145 can be configured to receive communications may also include one or more of an obstacle detector 155, a network adaptor 240, a separate barrier operator 102, a hand-held transmitter 110, a wall control 115, a door position sensor 160, to name but a few, and combinations thereof. Communications with such devices allow the feature enhancement device 120 to provide features such as automatic barrier control in response to obstacle detection through which the feature enhancement device 120 can stop operation of a pre-installed barrier operator 100. In one such example, the obstacle detector 155 is connected to the feature enhancement device 120. If the feature enhancement device 120 receives a communication from the obstacle detector 155 that an obstacle has been detected and the feature enhancement device 120 knows that the barrier operator 100 is closing the barrier, the feature enhancement device 120 can communicate with the barrier operator 100 to stop the barrier and potentially send the barrier in the opening direction.

The feature enhancement device 120 can perform barrier position determination through communication with such peripheral devices to be able to determine and report out barrier 105 position among other possibilities or features that can be provided. The position determination peripheral device 160, 170 allows the feature enhancement device 120 to determine whether or not the barrier 105 is closed and to report to a remote user the position of the barrier 105 prior to activation of the movable barrier operator. Example position determination devices include limit switches 170, door monitors, tilt switches 160, and the like. The position determination peripheral device 160, 170 could be a transmit only device that transmits position information in response to any change of the position of the barrier 105. In an alternative approach, the position determination peripheral device 160, 170 could be a bidirectional communication device allowing the feature enhancement device 122 to request information about the position of the barrier 105.

In still another approach, the input/output module 145 is configured to receive communications from at least one peripheral device including a sending device where the communications include an identification signal indicating that the sending device is available for communication with the input/output module 145. In this example, the sending device may be any peripheral device described above that can have communications with a feature enhancement device 120 and facilitate installation and configuration of these peripheral or sending devices with the feature enhancement device 120. In one example, a sending device may include a button or other user interactive element that can be actuated by a user that will effect sending a signal that, on receipt by the feature enhancement device 120, indicates to the feature enhancement device 120 that the sending device is ready and able to be used by or communicate with the feature enhancement device 120. As yet another example, the sending device can be a device used for notification of imminent barrier motion. In this approach, the feature enhancement device 120 can be designed such that it requires the detection of the sending device prior to allowing at least a particular barrier motion.

In another example, the input/output module 145 can receive wireless local area network communications with one or more of the peripheral devices. Based on these communications from the wireless local area network, the control circuitry 140 is configured to decide which radio frequency communication format is sent to the pre-installed barrier operator 100. The wireless local area network devices may communicate using Wi-Fi, Bluetooth, or any other wireless based communication between or among peripheral devices located in the vicinity of the feature enhance device 120. In one example, the control circuitry 140 may recognize a communication style or command sent to or from the pre-installed barrier operator 100 via the wireless local area network and configure the operator communication module 125 accordingly. In another example, the control circuitry 140 may receive a communication over the wireless local area network with information identifying the pre-installed barrier operator 100 or its communication method. In one such example, a user may look up the pre-installed barrier operator 100 on a computing device 215 and send that information regarding the operator 100 to the feature enhancement device 120 using, for example, the wireless local area network.

In another example, the input/output module 145 is configured to receive the communications from at least one peripheral device comprising an obstacle detector 155, as shown in FIG. 1. Such a configuration in combination with the feature enhancement device 120 communication with the pre-installed barrier operator 100 allows the feature enhancement device 120 to add obstacle detection features to a pre-installed barrier operator 100 incapable of incorporating such features. For example, the control circuitry 140 can be configured to not send a signal to effect closing the barrier 105 by the pre-installed barrier operator 100 in response to receiving any one of a variety of signals from the obstacle detector 155 that it would be unsafe to close the barrier 105. For example, the control circuitry 140 is configured not to send a signal to effect closing the barrier 105 in response to receiving a command to do so when detecting that the obstacle detector 155 is unable to detect an obstacle. This may occur where the obstacle detector 155 is an optical detector that is not properly aligned or otherwise rendered incapable of performing its task of detecting an obstacle and thus being unable to warn against operation if an obstacle is present. In another approach, the control circuitry 140 will not send a signal to effect closing the barrier 105 in response to receiving an indication from the input/output module 145 that the obstacle detector 155 detected an obstacle or in response to receiving indication that the pre-installed barrier operator 100 is opening the barrier 105. In still another approach, the control circuitry 140 may be configured to send a signal to effect opening a barrier 105 by the pre-installed barrier operator 100 in response to detecting that the obstacle detector 155 is unable to detect an obstacle or in response to receiving indication from the input/output module 145 that the obstacle detector 155 detected an obstacle. Similarly, in response to receiving an indication from a peripheral device that the pre-installed barrier operator 100 is closing a barrier 105 such as from a barrier position sensor 160 or the like, the control circuitry 140 is configured to send a signal to effect opening the barrier 105 by the pre-installed barrier operator 100 in response to detecting that the obstacle detector 155 is unable to detect an obstacle or in response to receiving an indication from the input/output module 145 that the obstacle detector 155 detected an obstacle. So configured, a variety of the advantages to having an obstacle detector can be added to pre-installed barrier operator 100 that is otherwise incapable of using such obstacle detector technology.

In another specific example, the input/output module 145 can be configured to receive communications from at least one peripheral device including a sensor 160 disposed to detect a location of a barrier 105 operated by the pre-installed barrier operator 100. The sensor 160 is illustrated as a tilt sensor, although any of a variety of other sensors may be used such as a limit switch, an accelerometer, a gravity sensor, or combinations thereof. Limit switches can be magnetic or physical switches placed along a track or other path of travel for the barrier 105 to detect the location of the barrier 105. A tilt sensor may comprise a microelectromechanical (MEMS) switch, an optical sensor, or other physical switch that is mounted to detect the barrier's 105 orientation. For example, the tilt sensor 160 as known in the art is mounted on the barrier 105 to determine the barrier 105's vertical or horizontal orientation and based on that information, a determination can be made as to whether the door is open, i.e., the barrier is horizontally disposed, or closed, i.e., the barrier is vertically disposed. An accelerometer may be piezo electric based or MEMS switch as known in the art. In still another approach, the input/output module 145 can be configured to receive communications from at least one peripheral device including a hand-held transmitter 110 configured to send barrier commands via a radio frequency transmission to the input/output module 145.

In yet another approach, the input/output module 145 is configured to receive communications from at least one peripheral device including a network adapter 240 to effect a connection to the Internet. As illustrated in FIG. 1, the network adapter 240 is a separate device plugged into the wall that can communicate with the input/output module 145 with the feature enhancement device 120 using any available communication method. The network adapter 240 then has a separate connection to a network that facilitates a communication to the Internet. This communication or connection can be accomplished in a variety of ways as recognized by those skilled in the art. For example, the network adapter 240 may have a wireless connection to a cellular standard to facilitate the connection to the Internet. By another approach, the network adaptor 240 can incorporate a power line communication protocol whereby communications are transmitted over local power lines between devices connected to the power lines. In still another approach, the network adaptor 240 can create a network connection via an Ethernet wire line connection to a network device. Another example network adapter 240 connection approach is a Wi-Fi connection such as with the wireless device 220. The network adaptor 240 in various approaches can plug into the feature enhancement device 120 to provide such communication abilities or be built into the device as part of the input/output module 145. For instance, in this example, the input/output module 145 can communicate using a wireless communication standard such as Wi-Fi to exchange network communications with the network device 220.

In any event, the input/output module 145 is configured to send communications to and receive communications from devices over the Internet. Such communications may include receiving commands to operate the pre-installed barrier operator 100 from a device over the Internet or to send status information regarding the pre-installed barrier operator 100 to a device over the Internet. So configured, the feature enhancement device 120 can allow a user to use a mobile computing device 230 that is located remote from the pre-installed barrier operator 100 to operate the barrier operator 100 or to simply receive information regarding whether the barrier is open or closed, for example, or whether a particular vehicle is in the garage.

Figure 3:
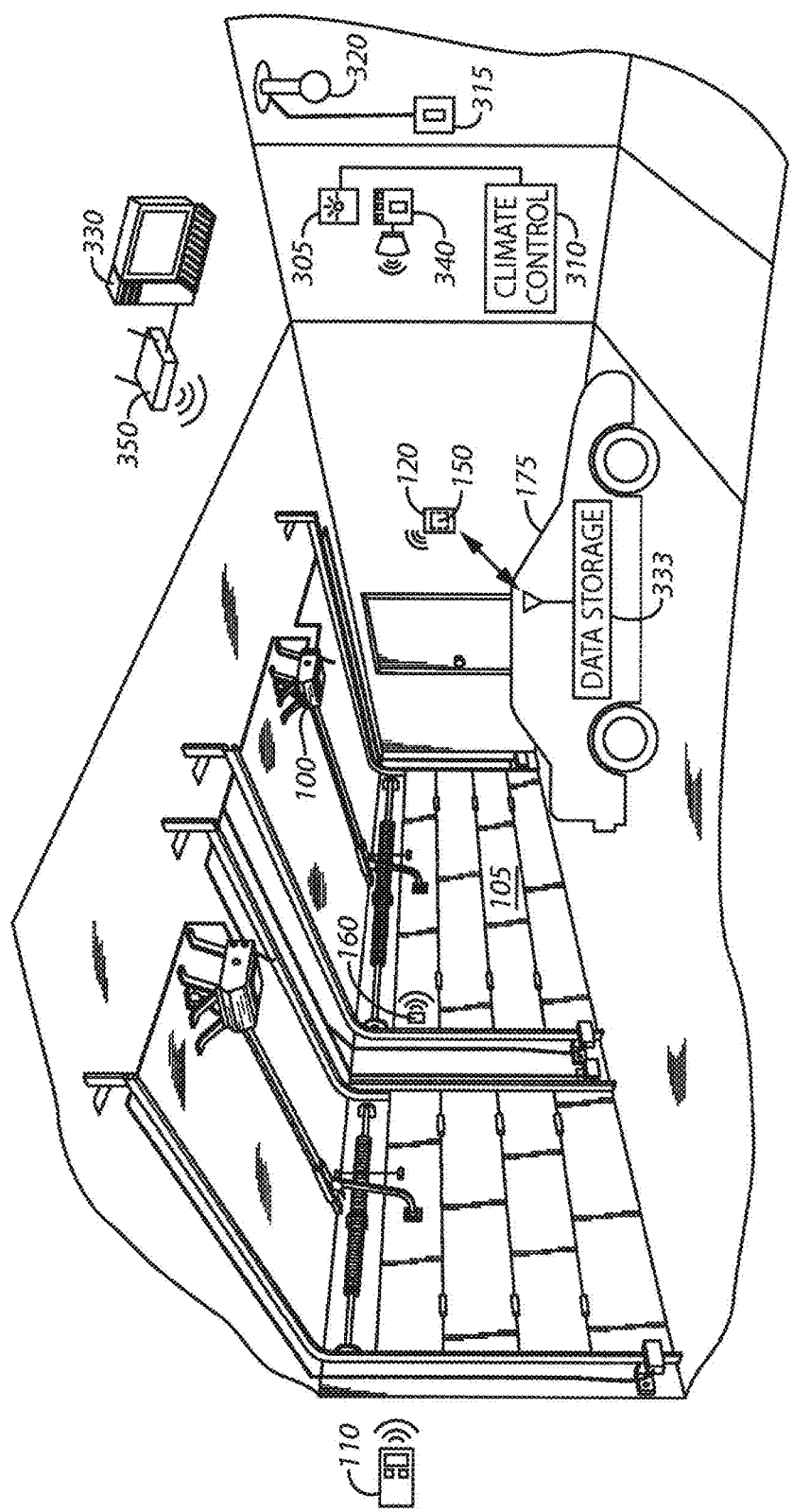
FIG. 3 comprises a schematic diagram of a building having various devices that may communicate with a barrier operator feature enhancement device as configured in accordance with various embodiments of the invention.

For example, and as illustrated in FIGS. 2 and 3, the barrier operator feature enhancement device 120 may include a presence detector 170 configured to detect presence of a vehicle 175 and is in operable communication with the control circuitry 140. Presence detectors 170 can include passive infrared detectors, a photo beam system, a magnetic detector, a capacitance detector, sound detector, a camera with image analysis algorithms, or a communication system designed to detect identification information from a vehicle 175, or cell phone of the user from the radio communications such as Bluetooth, each of which is known in the art and needs no further description here. Examples include U.S. Pat. Nos. 7,221,289 and 7,994,896, each of which is incorporated by reference in its entirety herein. As an example a magnetic detection peripheral device can be mounted just below the preinstalled operator 100. When the vehicle is present it affect the magnetic field generated by the detector in such a way that the detector device can determine whether the vehicle is positioned below is or not. In turn, the control circuitry 140 is configured to effect communication with one or more of the peripheral devices in response to an initial detection of the vehicle 175. As described above and is further illustrated in FIG. 3, the feature enhancement device 120 through its input/output module 145 can be configured to communicate with any of a variety of other devices. Accordingly, the feature enhancement device 120 can effect changes in the operation of a variety of those devices in response to detecting presence or absence of a vehicle 175. For example, in response to an initial detection of the vehicle 175 the control circuitry 140 can effect a communication with a thermostat device 305 to effect a change in temperature setting for a climate control system 310 of a structure associated with the barrier 105. Another example includes effecting communication with a lighting control device 315 to effect a change in a lighting configuration such as lights for a home 320. For instance, in response to detecting an initial presence of a vehicle 175 driving into the driveway or garage, the feature enhancement device 120 can effect lighting of certain rooms that the driver of the vehicle 175 will first enter upon exiting the garage. Other lighting configurations are of course possible. In another example, in response to initial detection of the vehicle, the control circuitry 140 can effect communication with a computing device 330 to effect synchronization of data stored in the vehicle 175 at a data storage device 333 with data stored on the computing device 330. Such data can be any of a variety of things, such as media files, mapping data, navigation data, vehicle information (including operation statistics, maintenance needs, and the like), and combinations thereof.

In still another example, in response to an initial detection of the vehicle 175, the control circuitry 140 can effect a communication with a security system 340 to effect a change in status of the security system 340. For instance, detection of the vehicle 175 in the garage can initiate a disarming of a home security system with respect to an entry from the garage into the house or other building or security structure. A similar approach can be applied to a commercial setting with respect to causing a change in a commercial security system in response to detecting presence of a particular vehicle.

In still another example, in response to an initial detection of the vehicle 175, control circuitry 140 can effect communication with the home-based computing device 330 to effect sending a message to a user of the home-based computing device 330. One such message may simply be a text or similar message to someone else at the home indicating that a vehicle has arrived in the garage. In still another example, in response to an initial detection of the vehicle 175, control circuitry 140 can effect a communication with a gateway communication device 350, such as a Wi-Fi router or home automation gateway device, or a direct communication with one or more of the thermostat device 305, climate control system 310, lighting controller 315, computing device 330, security system 340, and home-based computing device 330 as opposed to having direct communication in between the feature enhancement device 120 and those various other devices. The communication can be any known communication method including Z-wave, Zigbee, INSTEON, and X10 to name but a few examples.

Similarly, the feature enhancement device 120 may also communicate with any of the above devices in response to an initial detection of the absence of the vehicle 175. In this example, after the vehicle 175 drives out of the garage, the presence detector 170 will notice that the car 175 is no longer in the garage, and in response to the presence detector 170 making that determination, the control circuitry 140 can effect communication with any of the above devices to effect a change in their status, as described above. For example, the thermostat device 305 may be commanded to change a default temperature for the home while the occupant is gone, the security system 340 may be armed while the occupant is gone, the lighting controller device 315 may be set to turn the lights off when the occupant is gone during the daytime, and a message may be sent to a user using a computing device 330 that is still in the house providing notice that the vehicle 175 has left the garage.

Another feature that can be added by the barrier operator feature enhancement device 120 is the ability to detect and respond to a forced entry. In one such approach, in response to receiving from a peripheral device or from the pre-installed barrier operator 100 a communication indicating an attempt at forced entry, the control circuitry 140 is configured to send a communication to another of the peripheral devices to effect a security system response. For instance, a device 165 may be placed on the door or rails that can sense when a person tries to force open the door 105 and responsively send a signal regarding this attempt to the feature enhancement device 120. This device 165 can detect the attempt to force open the door 105 by measuring sound, vibration, door motion, and/or any other detection method as known in the art. Some known barrier operators also have this ability to sense the forced entry and generate a signal that can be received by the feature enhancement device 120. In response to receiving such a signal, the feature enhancement device 120 can communicate with a security system 340 or otherwise sound an alarm such as flashing its light 180 or sounding an alarm from its sound generator 185. Other examples include sending a communication to a vehicle 175 to effect locking the vehicle 175, to effect engagement of the vehicle's security system alarm, to effect disablement of the vehicle's starting mechanism, and/or to effect flashing of the vehicle's lights. Another example includes sending a communication to a computing device 330 to effect an announcement over a local security system 340 or to effect blinking of lights 320 at an associated structure, for example, in a home. In still another example, a communication may be sent to a network enabled device 220, 240 to effect sending a communication to a mobile computing device 230 regarding the attempted or forced entry such that a homeowner can receive an alert on the homeowner's tablet or phone regarding the attempted or forced entry.

Another feature that may be enabled with the feature enhancement device 120 having a presence detector 170 includes changing parameters of a timer to close function based on the presence or absence of the vehicle 175. More specifically, the control circuitry 140 can be configured to effect a timer to close function including sending a signal to the barrier operator 100 to close the barrier 105 in response to the passage of time. The control circuitry 140 is also configured to, in response to receiving a signal from the presence detector 170 indicating presence or absence of the vehicle 175, change the parameters of the timer to close function. For example, the timer to close function may be inhibited by the control circuitry 140 if the presence detector 170 senses the presence of a vehicle 175. Similarly, the control circuitry 140 may enable a timer to close feature in response to the detection by the presence detector 170 that there are no vehicles left in the garage.

In still another approach, the presence detector 170 can be configured to determine the presence or absence of a particular vehicle 175, such that various features can be enabled or disabled in response to the detection of particular vehicles. More specifically, and in one example, the presence detector 170 can be configured to detect presence or absence of a plurality of specific vehicles through detection of a vehicle specific identifier received from individual ones of the specific vehicles. For instance, a given vehicle may have a universal garage door operator transmitter that is configured to send an identification signal to the movable barrier operator either directly or through an intermediary device or network. The input/output module 145 or presence detector 170 of the feature enhancement device 120 may receive that signal and decode the identification signal to identify the vehicle 175 and operate in accordance with pre-programming with respect to enabling or disabling certain features or actions in response to the presence or absence of the specific vehicle 175. Other options for determining or receiving the vehicle's identification number include receiving a Bluetooth communication from the vehicle, receiving a cellular communication from the vehicle, receiving communications from a specific user's mobile device through (such as though Bluetooth, Wi-Fi, mobile network communication, or the like) or by other means known to those skilled in the art.

Turning again to FIG. 2, the feature enhancement device 120 may further include a light 180 and a sound generator 185. The control circuitry 140 is configured to effect generation of a sound by the sound generator 185 and flashing of the light 180 in coordination with sending a signal to effect closing of the barrier 105 by the pre-installed barrier operator 100. Typically in this situation where the barrier operator 100 receives the command to operate the barrier operator 100 from a device that is remote from the garage, flashing the light 180 and producing a sound from the sound generator or speaker 185 acts as a warning to those in the vicinity of the garage that the barrier 105 will be closing. In one example, the control circuitry 140 is configured to disable generation of a sound by the sound generator 185 with flashing of the light 180 in response to determining that the pre-installed barrier operator 100 includes a sound generator and light effect to provide an alert regarding closing of a barrier 105 by the pre-installed barrier operator 100. This configuration allows the feature enhancement device 120 to not unnecessarily duplicate the effect as may be provided by the pre-installed barrier operator 100.

In accord with the structures described above, and with reference to FIG. 4, a method 400 of operation of a feature enhancement device 120, which can be considered a "retrofit" device, will be described. The method includes sending 410 communication signals from a communication module via a plurality of communication protocols to a pre-installed barrier operator. The retro-fit device receives 415 a communication indicating a response from the pre-installed barrier operator, and, in response, the retro-fit device configures 420 the communication module to operate according to a communication protocol that effected the response from the pre-installed barrier operator. Accordingly, the retro-fit device is now in a position to communicate with the pre-installed barrier operator to provide one or more additional features that may have been missing from the pre-installed barrier operator.

For example, the retro-fit device may receive 425 information from a peripheral device and determine 430 an action or setting change for the pre-installed barrier operator based on the information from the peripheral device. After making that determination, the retro-fit device sends 430 a communication signal according to the communication protocol to the pre-installed barrier operator. That communication signal is configured to effect the action or setting change to the pre-installed barrier operator. As described above, the process of configuring the communication module to operate according to a particular communication protocol may include consideration or utilization of information from one or more peripheral devices to help make the determination of which protocol to use in communicating with the pre-installed barrier operator.

Figure 4:
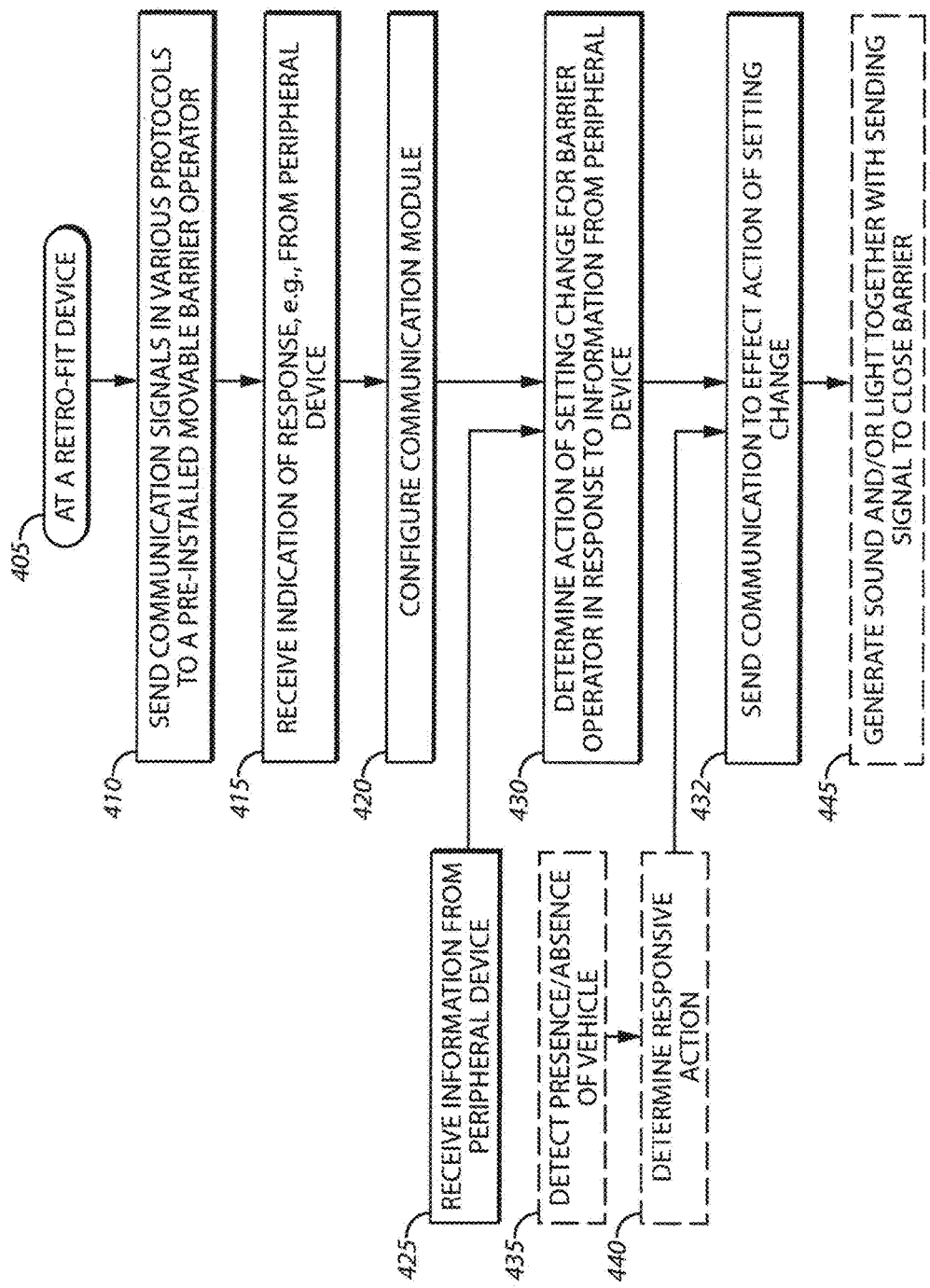
FIG. 4 comprises a flow diagram of an example method of operation for a barrier operator feature enhancement device as configured in accordance with various embodiments of the invention.

In an additional alternative embodiment, the functionality or logic described with respect to FIG. 4 and elsewhere in this disclosure may be embodied in the form of code that may be executed in a separate processor circuit. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s). Any of these structures are known to those of skill in the art and needs no further description.

The feature enhancement device 120 described in this application may be packaged together with any of a variety of the peripheral devices described above to facilitate provision of features to pre-installed barrier operators. For example, the feature enhancement device may be sold together with obstacle detectors, a tilt sensor for mounting on the door, a remote control device, a network adapter, and the like. Such a kit can then be purchased by a user and installed as described above to provide enhanced operability to the barrier operator previously installed at the user's premises.

Figure 5:
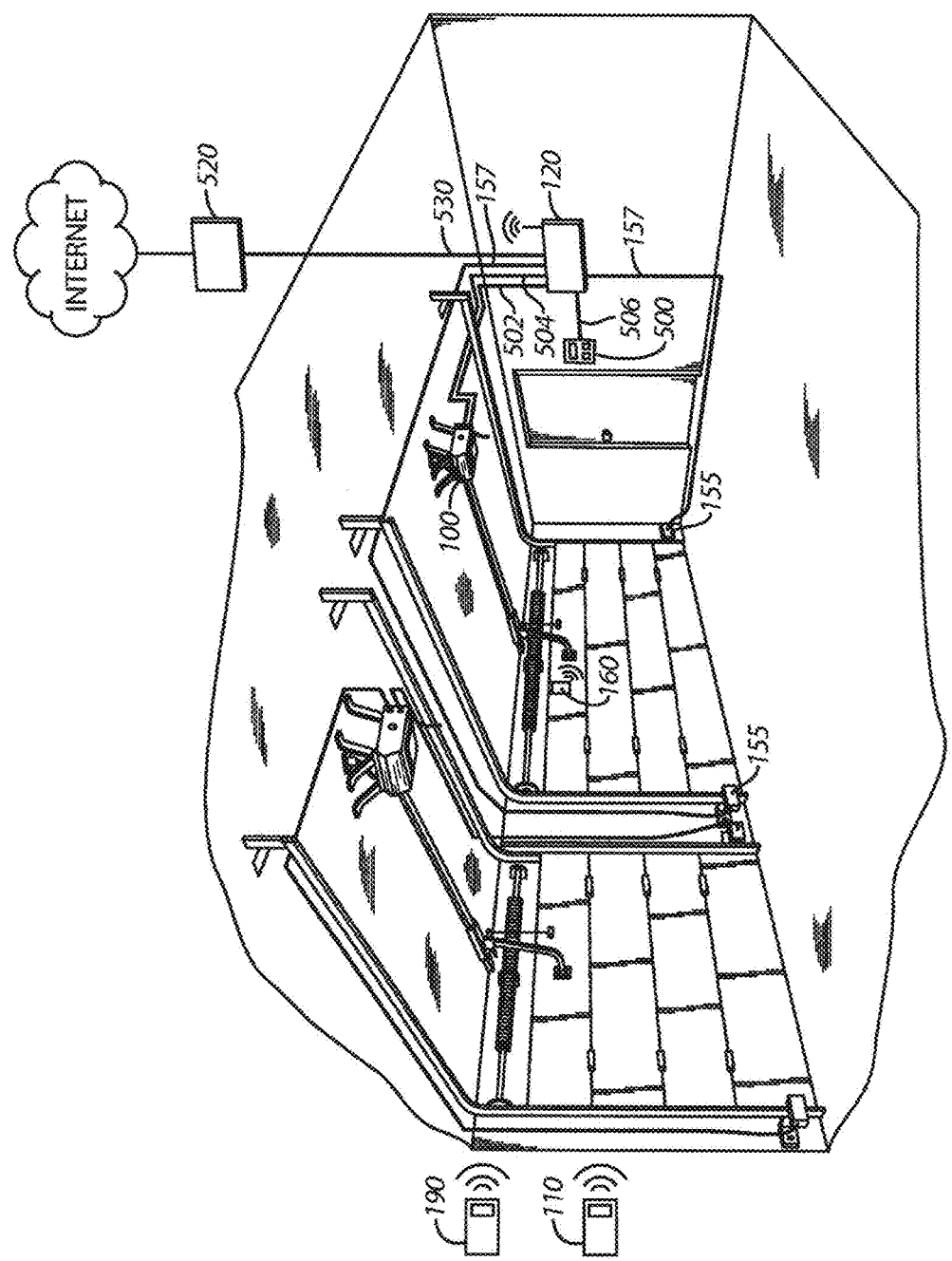
FIG. 5 comprises a perspective view of an example environment in which a barrier operator feature enhancement device may be applied as configured in accordance with various embodiments of the invention.

In one specific example, FIG. 5 illustrates one potential arrangement of the feature enhancement device 120. In this approach, the preinstalled operator 100 is connected to the feature enhancement device 120 via wire connections to the operator's command input 502 and to the operator's obstruction input 504. Feature enhancement device 120 is also connected via wires 506 to the original wall control 500 that came with the preinstalled operator 100. The handheld transmitter's 110 radio frequency signal is received by the feature enhancement device 120 to activate the preinstalled operator 100 via the feature enhancement device 120. The feature enhancement device 120 is also connected via a wire 530 to a router/modem 520, which connects the system to the Internet in well-known method. In this way, the feature enhancement device 120 can allow activation of the barrier operator from the Internet, from the preinstalled operators wall control 500, and from the handheld transmitter 110. Not shown is the possibility of utilizing the wireless capabilities of feature enhancement device 120 to communicate directly with a portable computational device. The communication can be done by any of a number of possible communication formats including Bluetooth and Wi-Fi as examples. Due to the communications being routed through the feature enhancement device 120, the feature enhancement device 120 is able to control when and if command reaches the preinstalled operator 100.

As explained earlier, the feature enhancement device 120 can have a light 180 and a sound generator 185. The light 180 and sound generator 185 can be utilized to pre-warn before the command is sent to the preinstalled barrier operator 100. For example, if the feature enhancement device 120 received a command to move or close the barrier over the Internet, the feature enhancement device 120 can turn on or flash the light 180 and/or play a warning sound from the sound generator of a time before sending a command to the pre-installed barrier operator 100 to move or close the barrier. In this way, unattended operation of the preinstalled barrier operator can be announced prior to the motion of the barrier.

The feature enhancement device 120 can also report on the status of the preinstalled barrier operator 100. For example, the feature enhancement device 120 can monitor the door's position through communication with the sensor 160 and knowledge of the commands given to the barrier operator 120 and then notify a remote device via the Internet or through local wireless communications of the present status of the barrier 105. In the case where a handheld transmitter 190 is directly paired with the preinstalled operator 100 to move the barrier 105, the feature enhancement device 120 can still monitor the barrier 105 status through communication with the door position sensor 160.

Figure 6:
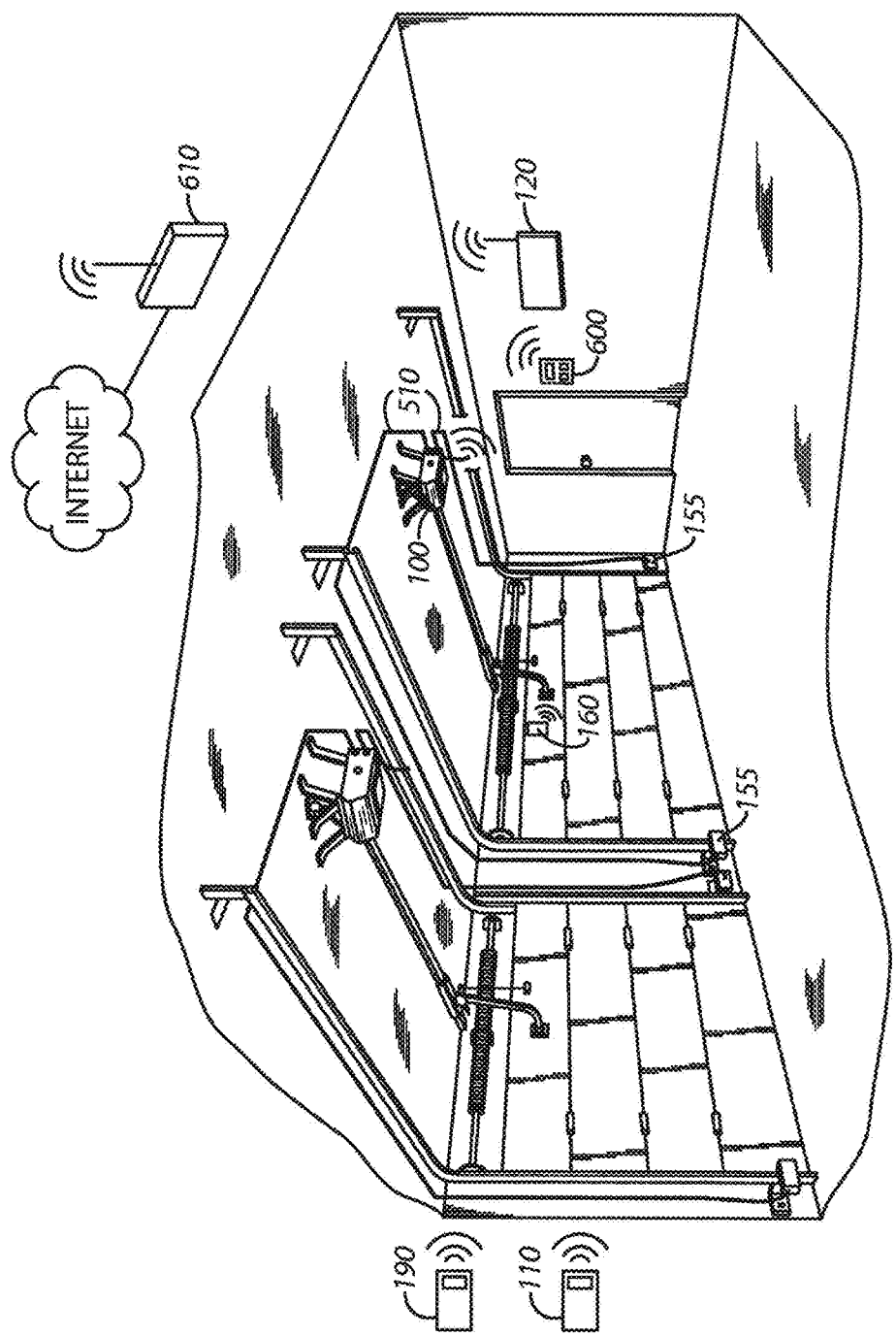
FIG. 6 comprises a perspective view of an example environment in which a barrier operator feature enhancement device may be applied as configured in accordance with various embodiments of the invention.

In this example, the feature enhancement device 120 is wired to the obstacle detectors 155 via a set of wires 157. The feature enhancement device 120 can monitor the obstacle detectors 155 to ensure that they are functioning properly and feature enhancement device 120 can control the barrier operator 100 accordingly for combination of the command input 502 and the other obstruction input 504. The feature enhancement device 120 can also monitor the actions of the preinstalled operator 100 via the sensor 160 to ensure that the operator is performing the intended function. If the barrier 105 is in motion in the downward direction and the feature enhancement device 120 detects a failure of the obstacle detector 155, the feature enhancement device 120 can force the operator 100 to reverse direction by shorting the obstruction input 504. If that action is not followed, the feature enhancement device 120 can give one or more commands via the command input 502 to perform the desired function. In another example, FIG. 6 illustrates a system where the feature enhancement device 120 is completely wireless. In this situation, the feature enhancement device 120 can be a module that plugs into the wall somewhere near the garage, such as at a typical electrical outlet. In this example, the preinstalled operator 100 includes preinstalled obstacle detectors 155 that are directly connected to and monitored by the operator 100 via wires 510.

In the example of FIG. 6, the feature enhancement device 120 communicates with a Wi-Fi router/modem 610, which is connected to the Internet using methods well known in the art. Feature enhancement device 120 also communicates to the preinstalled barrier operator 100 by sending a radio transmission to activate the operator 100. A door position sensor 160 wirelessly communicates with the feature enhancement device 120. A handheld transmitter 110 communicates with the feature enhancement device 120 via wireless communication. A wall button 600 communicates wirelessly with the feature enhancement device 120, although the wall button 600 aspect can be included within the device 120. An original transmitter 190 is paired and communicates directly with the preinstalled operator 100. Although not shown explicitly in this figure, the feature enhancement device 120 is able to communicate directly and wirelessly with other computational devices to provide direct access for the computational device to effect activation of the preinstalled operator 100 and obtain information regarding a status of the barrier 105. This example enables Internet activation of the barrier operator 100 and marking of the barrier position allowing long-range operation and monitoring of the preinstalled barrier operator.

Those skilled in the art will recognize that a wide variety of modifications, alterations, and combinations can be made with respect to the above described embodiments without departing from the scope of the invention. For example, although the feature enhancement device is described largely in the context of a garage in use with a garage door opener, such a feature enhancement device can be applied in other barrier operator contexts, such as gate operators and the like. Moreover, any of the retro-fit features described herein can be incorporated into a movable barrier operator. For instance, the various capabilities described with respect to sensing vehicle presence or absence, sensing forced entry, and the like can be triggered or controlled by a movable barrier operator incorporating the associated features of such a retro-fit device. Such modifications, alterations, and combinations are to be viewed as being within the ambit of the inventive concept.

What is claimed is:

1. An apparatus comprising:
    a housing configured to mount in a garage, the housing containing:
        a communication module configured to communicate with a plurality of barrier operator types that use different communication protocols, the communication module further configured to send and receive signals according to at least one of wireless and wired communication protocols;
        control circuitry interfaced with the communication module to communicate with any of the plurality of barrier operator types, the control circuitry configured to control the communication module to communicate with at least one pre-installed barrier operator to control operation of at least one feature of the at least one pre-installed barrier operator; and
        an input/output module interfaced with the control circuitry, the input/output module configured to receive a communication from at least one peripheral device, the communication including a command to effect closing of a barrier by the at least one pre-installed barrier operator;
    wherein the input/output module is further configured to receive a communication from an obstacle detector;
    wherein the control circuitry is further configured, in response to the communication from the obstacle detector, to refrain from sending a signal to the at least one pre-installed barrier operator to effect closing a barrier by the at least one pre-installed barrier operator despite receiving the command from the peripheral device.

2. The apparatus of claim 1 wherein the control circuitry is configured to send a signal to effect opening the barrier by the at least one pre-installed barrier operator in response to the communication from the obstacle detector.

3. The apparatus of claim 1 wherein the input/output module is configured to communicate with a second peripheral device that provides an indication of closing the barrier; and
    wherein in response to receiving the indication from the second peripheral device, the control circuitry is configured to send a signal to effect opening the barrier by the at least one pre-installed barrier operator in response to the communication from the obstacle detector.

4. The apparatus of claim 1 wherein the obstacle detector includes an optical detector.

5. The apparatus of claim 1 wherein the communication from the obstacle detector indicates a detection of an obstacle.

6. The apparatus of claim 1 wherein the communication from the obstacle detector indicates an inability of the obstacle detector to detect an obstacle.

7. The apparatus of claim 6 wherein the obstacle detector comprises an optical detector, and wherein the communication from the obstacle detector indicates misalignment of the optical detector.

8. An apparatus comprising:
    a barrier operator communication module configured to communicate with a plurality of barrier operator types that use different communication protocols, the communication module further configured to send and receive communication signals by wireless or wired communication protocols;
    control circuitry interfaced with the barrier operator communication module to communicate with any of the plurality of barrier operator types, the control circuitry configured to control the barrier operator communication module to communicate with at least one pre-installed barrier operator to effect at least one of:
        controlling of operation of at least one feature of the at least one pre-installed barrier operator; and
        monitoring of at least one aspect of the at least one pre-installed barrier operator;
    an input/output module operatively in communication with the control circuitry, the input/output module configured to receive communications from at least one peripheral device including an obstacle detector, the communications configured to provide at least one of:
        information regarding an operation status of the at least one pre-installed barrier operator and information to effect operation of the at least one pre-installed barrier operator;
    the control circuitry further configured to, in response to receiving a communication from the at least one peripheral device via the input/output module, effect at least one of:
        sending a communication to the at least one pre-installed barrier operator to cause at least one of effecting a movement of a barrier and changing a setting of the at least one pre-installed barrier operator, or
        sending a communication to the at least one peripheral device regarding the status of the at least one pre-installed barrier operator;

wherein the input/output module is configured to receive communications from the obstacle detector; and wherein the control circuitry is configured to refrain from sending a signal to the at least one pre-installed barrier operator to effect closing a barrier by the at least one pre-installed barrier operator in response to receiving a command to close the barrier when detecting that the obstacle detector is unable to detect an obstacle, in response to receiving an indication from the input/output module that the obstacle detector detected an obstacle, or in response to receiving an indication that the at least one pre-installed barrier operator is opening a barrier.

9. The apparatus of claim 8 wherein the control circuitry is configured to send a signal to effect opening the barrier by the at least one pre-installed barrier operator in response to detecting that the obstacle detector is unable to detect an obstacle or in response to receiving indication from the input/output module that the obstacle detector detected an obstacle.

10. The apparatus of claim 8 wherein in response to receiving an indication from the at least one peripheral device that the at least one pre-installed barrier operator is closing a barrier, the control circuitry is configured to send a signal to effect opening the barrier by the at least one pre-installed barrier operator when detecting that the obstacle detector is unable to detect an obstacle or in response to receiving indication from the input/output module that the obstacle detector detected an obstacle.

11. An apparatus comprising:
a wireless communication interface configured to:
exchange communications including wireless local area network communications with peripheral devices including an obstacle detector, and
send radio frequency communications in a plurality of formats to a pre-installed barrier operator;
control circuitry operatively coupled to the wireless communication interface and configured to use the wireless communication interface for communicating with the pre-installed barrier operator to effect opening and closing of the pre-installed barrier operator, the control circuitry further configured to refrain from sending a signal to effect closing the barrier by the pre-installed barrier operator upon receiving a command to close the barrier in response to detecting that the obstacle detector is unable to detect an obstacle, in response to receiving an indication that the obstacle detector detected an obstacle, or in response to receiving an indication that the pre-installed barrier operator is opening a barrier.

12. The apparatus of claim 11 wherein the control circuitry is configured to send a signal to effect opening a barrier by the pre-installed barrier operator in response to detecting that the obstacle detector is unable to detect an obstacle or in response to receiving an indication that the obstacle detector detected an obstacle.

13. The apparatus of claim 11 wherein in response to receiving an indication from one of the peripheral devices that the pre-installed barrier is closing a barrier, the control circuitry is configured to send a signal to effect opening the barrier by the pre-installed barrier operator when detecting that the obstacle detector is unable to detect an obstacle or in response to receiving an indication that the obstacle detector detected an obstacle.

14. A method comprising:
at a barrier operator feature enhancement device:
sending communication signals from a communication module of the barrier operator feature enhancement device via a plurality of communication protocols to a pre-installed barrier operator;
receiving a communication indicating a response from the pre-installed barrier operator;
configuring the communication module to operate according to a communication protocol that effected the response from the pre-installed barrier operator;
receiving a close command from a peripheral device;
communicating with an obstacle detector via an input/output module of the barrier operator feature enhancement device; and
refraining from sending a communication signal from the communication module of the barrier operator feature enhancement device to the pre-installed barrier operator according to the communication protocol to effect closing a barrier by the pre-installed barrier operator upon receiving the close command in response to detecting that the obstacle detector is unable to detect an obstacle, in response to receiving an indication that the obstacle detector detected an obstacle, or in response to receiving an indication that the pre-installed barrier operator is opening a barrier.

15. The method of claim 14 further comprising sending a communication signal to effect opening the barrier by the pre-installed barrier operator in response to detecting that the obstacle detector is unable to detect an obstacle or in response to receiving an indication that the obstacle detector detected an obstacle.

16. The method of claim 14 further comprising, in response to receiving an indication from the peripheral device that the pre-installed barrier is closing a barrier, sending a communication signal to effect opening the barrier by the pre-installed barrier operator in response to detecting that the obstacle detector is unable to detect an obstacle or in response to receiving an indication that the obstacle detector detected an obstacle.

* * * * *

UNITED STATES PATENT AND TRADEMARK OFFICE
CERTIFICATE OF CORRECTION

PATENT NO. : 10,138,671 B2
APPLICATION NO. : 15/881406
DATED : November 27, 2018
INVENTOR(S) : James J. Fitzgibbon et al.

It is certified that error appears in the above-identified patent and that said Letters Patent is hereby corrected as shown below:

On the Title Page

Item (72) Inventors: Change "Robert R. Keller" to -- Robert R. Keller, Jr. --

Signed and Sealed this
Second Day of April, 2019

Andrei Iancu
*Director of the United States Patent and Trademark Office*